United States Patent
Kondo et al.

(10) Patent No.: US 12,001,669 B2
(45) Date of Patent: Jun. 4, 2024

(54) SEARCHING FOR WRITE INFORMATION CORRESPONDING TO A FEATURE OF AN IMAGE

(71) Applicant: Sony Group Corporation, Tokyo (JP)

(72) Inventors: Gakuya Kondo, Tokyo (JP); Chao Ma, Tokyo (JP)

(73) Assignee: Sony Group Corporation, Tokyo (JP)

( * ) Notice: Subject to any disclaimer, the term of this patent is extended or adjusted under 35 U.S.C. 154(b) by 400 days.

(21) Appl. No.: 17/439,101

(22) PCT Filed: Mar. 17, 2020

(86) PCT No.: PCT/JP2020/011585
§ 371 (c)(1),
(2) Date: Sep. 14, 2021

(87) PCT Pub. No.: WO2020/203238
PCT Pub. Date: Oct. 8, 2020

(65) Prior Publication Data
US 2022/0147240 A1   May 12, 2022

(30) Foreign Application Priority Data
Mar. 29, 2019  (JP) .................. 2019-065382

(51) Int. Cl.
*G06K 9/00* (2022.01)
*G06F 3/04883* (2022.01)
(Continued)

(52) U.S. Cl.
CPC ........ *G06F 3/04883* (2013.01); *G06F 16/538* (2019.01); *G06F 16/54* (2019.01); *G06V 10/757* (2022.01); *G06V 30/10* (2022.01)

(58) Field of Classification Search
CPC .............. G06F 40/169; G06F 3/04883; G06F 16/00–986; G06F 18/22; G06V 10/7788;
(Continued)

(56) References Cited

U.S. PATENT DOCUMENTS 8,208,737 B1 * 6/2012 Ie .......................... G06V 30/416
382/229
2002/0188602 A1 * 12/2002 Stubler .................. G06F 16/58
(Continued)

FOREIGN PATENT DOCUMENTS

EP    2 672 396 A1    12/2013
JP    2006-277167 A    10/2006
(Continued)

OTHER PUBLICATIONS

International Search Report dated Jun. 9, 2020 in PCT/JP2020/011585 filed on Mar. 17, 2020, 2 pages.

*Primary Examiner* — Atiba O Fitzpatrick
(74) *Attorney, Agent, or Firm* — Oblon, McClelland, Maier & Neustadt, L.L.P.

(57) ABSTRACT

An image processing device and method for more easily performing a write operation on an image. Write information corresponding to a feature of an image of processing target is searched for based on relevant information that associates the write information with the feature of the image. For example, it is furthermore possible to search for write information corresponding to the feature of an image of the processing target based on the learning result of the user's behavior. The present invention can be applied to, for example, an information processing device, an image processing device, electronic equipment, an image processing method, a program, or the like.

18 Claims, 20 Drawing Sheets

(51) Int. Cl.
    *G06F 16/538*     (2019.01)
    *G06F 16/54*     (2019.01)
    *G06V 10/75*     (2022.01)
    *G06V 30/10*     (2022.01)

(58) Field of Classification Search
    CPC .... G06V 10/761; G06V 10/751; G06V 10/46; G06V 10/757; G06V 10/759; G06V 10/443; G06V 10/74; G06V 10/75; G06T 7/0014; G06T 7/0016
    See application file for complete search history.

(56) References Cited

U.S. PATENT DOCUMENTS

| | | | |
|---|---|---|---|
| 2005/0060308 A1 | 3/2005 | Naphade et al. | |
| 2006/0224950 A1 | 10/2006 | Takaai et al. | |
| 2008/0021928 A1* | 1/2008 | Yagnik | G06F 40/169 |
| 2009/0289942 A1* | 11/2009 | Bailleul | G06F 16/58 |
| | | | 382/164 |
| 2009/0304272 A1* | 12/2009 | Makadia | G06V 10/40 |
| | | | 382/218 |
| 2009/0327856 A1* | 12/2009 | Mouilleseaux | G06F 16/70 |
| | | | 715/230 |
| 2011/0169858 A1* | 7/2011 | Sakaguchi | G06F 3/04883 |
| | | | 345/173 |
| 2013/0038613 A1* | 2/2013 | Kim | G06T 13/80 |
| | | | 345/473 |
| 2013/0163860 A1* | 6/2013 | Suzuki | G06V 30/224 |
| | | | 382/159 |
| 2013/0202205 A1 | 8/2013 | Liu et al. | |
| 2013/0342486 A1* | 12/2013 | Xin | G06F 3/041 |
| | | | 345/173 |
| 2014/0201148 A1 | 7/2014 | Doui et al. | |
| 2017/0116545 A1* | 4/2017 | Johnson | G06F 3/04883 |
| 2017/0300621 A1* | 10/2017 | Lee | G16H 15/00 |

FOREIGN PATENT DOCUMENTS

| | | |
|---|---|---|
| JP | 2011-141835 A | 7/2011 |
| JP | 2014-137739 A | 7/2014 |

\* cited by examiner

A

B

A

B

A

B

SEARCHING FOR WRITE INFORMATION CORRESPONDING TO A FEATURE OF AN IMAGE

TECHNICAL FIELD

The present disclosure relates to an image processing device and method, and a program, and in particular, relates to an image processing device and method, and a program that can more easily perform a write operation on an image.

BACKGROUND ART

Conventionally, a system capable of inputting write information of electronic data to a displayed image in a presentation and the like has been considered (for example, see Patent Document 1).

CITATION LIST

Patent Document

Patent Document 1: Japanese Patent Application Laid-Open No. 2011-141835

SUMMARY OF THE INVENTION

Problems to be Solved by the Invention

However, in a case of the method described in Patent Document 1, the write operation is managed depending on the time, and thus the user has to perform the write operation while taking the time into consideration in order to obtain a desired write operation result (i.e., input write information), which requires a complicated work.

The present disclosure has been made in view of such a situation, and is intended to make it easier to perform a write operation on an image.

Solutions to Problems

An image processing device of an aspect of the present technology is an image processing device including a search unit that searches write information corresponding to a feature of an image of processing target on the basis of relevant information that associates the write information with the feature of the image.

An image processing method of an aspect of the present technology is an image processing method including searching for write information corresponding to a feature of an image of processing target on the basis of relevant information that associates the write information with the feature of the image.

An image processing program of an aspect of the present technology is a program that causes a computer to function as a search unit that searches for write information corresponding to a feature of an image of processing target on the basis of relevant information that associates the write information with the feature of the image.

In an image processing device and method, and a program of an aspect of the present technology, write information corresponding to a feature of an image of processing target is searched on the basis of relevant information that associates the write information with the feature of the image.

MODE FOR CARRYING OUT THE INVENTION

Figure 1:
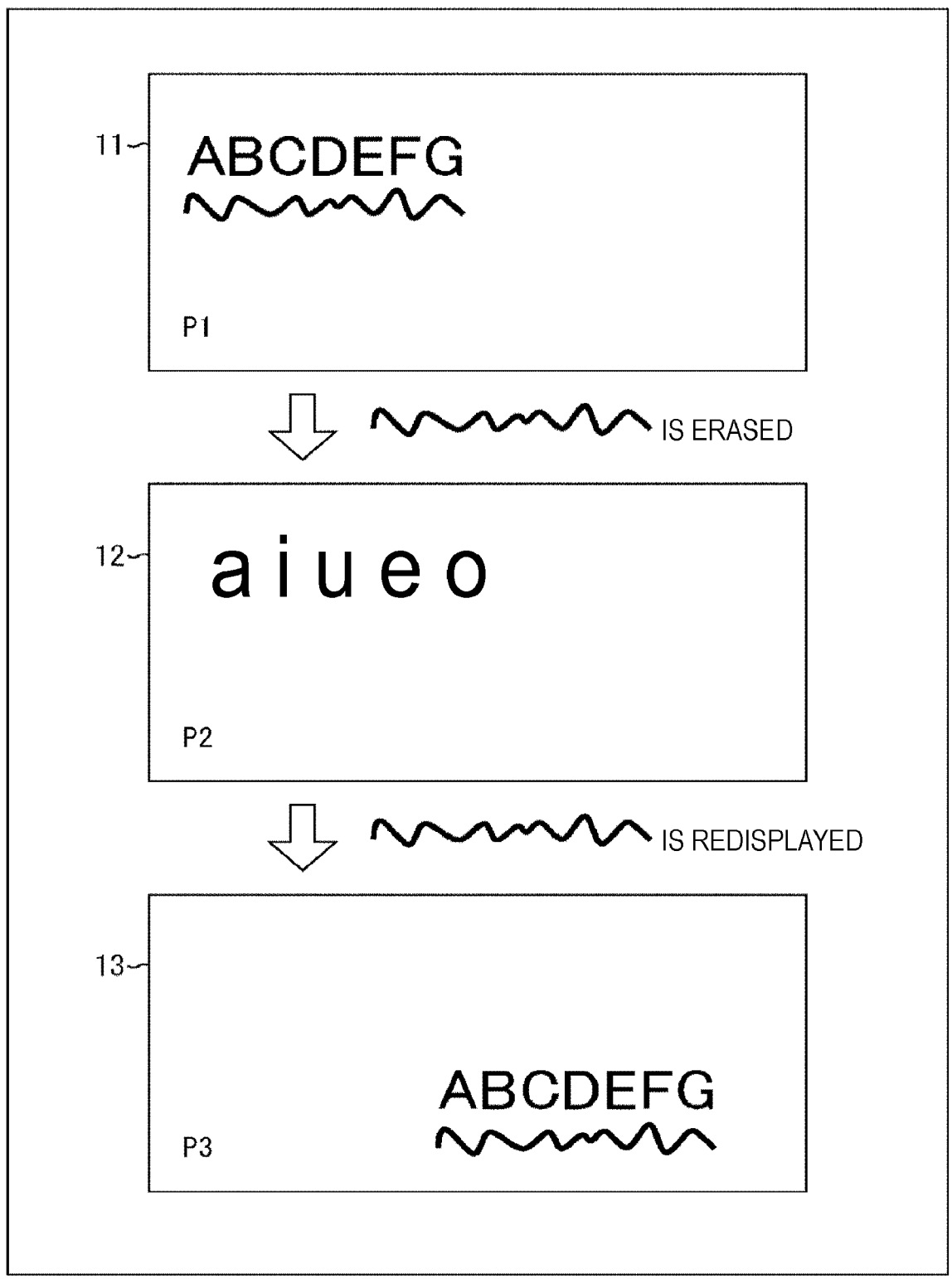
FIG. 1 is a view explaining an example of annotation management.

Embodiments for carrying out the present disclosure (hereinafter referred to as embodiments) will be described below. Note that the description will be made in the following order.

1. Management of annotation
2. First embodiment (Annotation output control device)
3. Second embodiment (Conference system)
4. Supplementary

1. Management of Annotation

Conventionally, a system capable of inputting write information of electronic data to a displayed image in a presentation and the like has been considered. In general, data of write information is managed independently of image data, and even if the image display is switched, the write information is not erased. That is, the display of meaningless write information remains for the newly displayed image. Therefore, the user has to manually erase the write information, which requires complicated work.

In a case of the method described in Patent Document 1, the determination of the locus is managed by time, and when the write operation is not performed for a certain period of time, the write information that the user does not want to erase is also erased, or it becomes impossible to perform an additional write operation without performing a menu operation. That is, also in a case of this method, the user is required to perform complicated operations such as considering the elapsed time during the write operation, and being required to perform a menu operation.

Furthermore, in a case of the method described in Patent Document 1, the data of write information is managed in association with the material information indicating the image data. Therefore, even if the image after switched has a high similarity to the image before switched but different in terms of data, it has been difficult to display, for the image after switched, the write information having been input to the image before switched.

Association with Feature of Image

Therefore, on the basis of the relevant information that associates the write information (annotation) with the feature of the image, the write information (annotation) corresponding to the feature of the image of processing target is searched. Note that in the present description, the write information (annotation) is image information that can be edited such as imparted, erased, and processed by the user or the like. The write information may be configured with any image, for example, may be configured with a character, a shape, a symbol, a pattern, a picture, or a plurality of them. Furthermore, for example, the write information may be a comment, a note, a circle, a wavy line, or the like, or may be other than those. Furthermore, the write information may be handwritten by the user, or may be an image or character prepared in advance that is imparted.

For example, the image processing device includes a search unit that searches write information corresponding to a feature of an image of processing target on the basis of relevant information that associates the write information with the feature of the image.

For example, the program is configured to cause the computer to function as a search unit that searches write information corresponding to a feature of an image of processing target on the basis of relevant information that associates the write information with the feature of the image.

By doing so, in a case where the same image is redisplayed, the write information (also referred to as an annotation) displayed last time can be displayed again. Furthermore, if the patterns (that means, for example, characters, symbols, designs, textures, and any other contents included in images) are similar (or if they include a similar pattern) even if the images have different data, the same write information can be redisplayed.

For example, it is assumed to sequentially display an image 11, an image 12, and an image 13 as shown in FIG. 1. When the image 11 is switched to the image 12, since only the character string of "aiueo" exists in the image 12, the write information (wavy line) described below the character string of "ABCDEFFG" in the image 11 is erased. Next, when the image 12 is switched to the image 13, since the character string of "ABCDEFG" exists in the image 13, the write information (wavy line) imparted in the image 11 is redisplayed. That is, the user can easily reproduce, in the image 13, the write information of the image 11 even without performing the same write operation in the case of the image 11. Therefore, the user can more easily perform a write operation (operation related to write information, such as impartment and erasure of write information) on the image.

2. First Embodiment

Annotation Output Control Device

Figure 2:
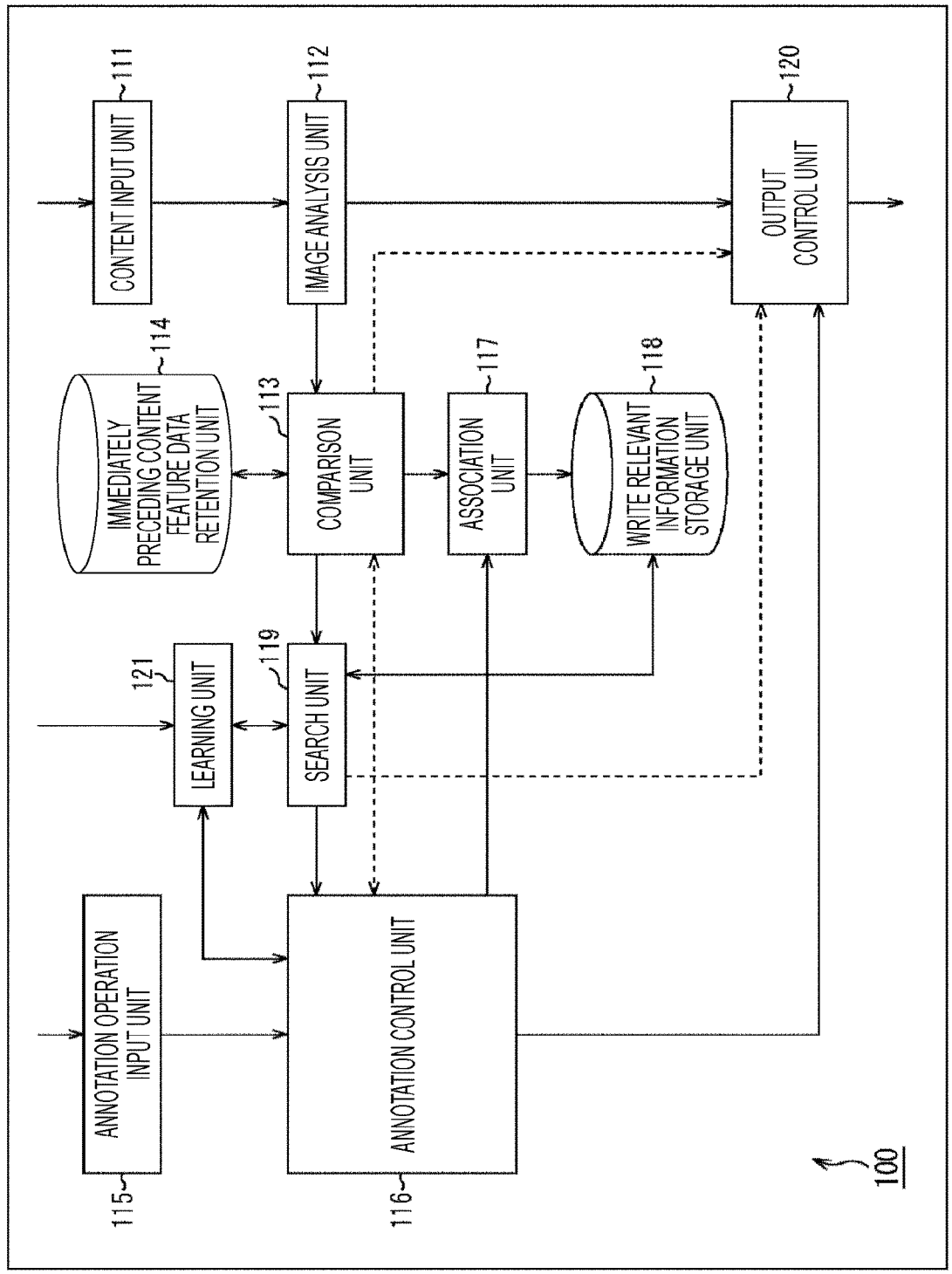
FIG. 2 is a block diagram showing a main configuration example of an annotation output control device.

FIG. 2 is a block diagram showing an example of the configuration of an annotation output control device that is an aspect of the information processing device to which the present technology is applied. An annotation output control device 100 shown in FIG. 2 is a device that controls the output (display and the like) of an annotation (write information) on a content image. Note that as described above, the write information (annotation) is image information that can be edited by the user or the like, and its content is discretionary. Furthermore, the content image is image information to which the write information can be imparted, and the content is discretionary.

As shown in FIG. 2, the annotation output control device 100 has a content input unit 111, an image analysis unit 112, a comparison unit 113, an immediately preceding content feature data retention unit 114, an annotation operation input unit 115, an annotation control unit 116, an association unit 117, a write relevant information storage unit 118, a search unit 119, an output control unit 120, and a learning unit 121.

Note that FIG. 2 shows the main part of the processing unit, the flow of data, and the like, and FIG. 2 does not necessarily show all. That is, the annotation output control device 100 may have a processing unit that is not shown as a block in FIG. 2, or may have a flow of processing or data that is not shown as an arrow or the like in FIG. 2.

The content input unit 111 receives input of a content image from another device, a recording medium, or the like. The content input unit 111 supplies the received content image to the image analysis unit 112 as each frame image of a moving image. Note that the input content image may be a moving image or a still image. In a case where the content image is a moving image, the content input unit 111 supplies the moving image to the image analysis unit 112. Furthermore, in a case where the content image is a still image, the content input unit 111 supplies, to the image analysis unit 112, a moving image in which the frame images of all frames are the content images.

The image analysis unit 112 performs image analysis on a content image supplied from the content input unit 111 and extracts its feature. By doing so, the annotation output control device 100 can perform output control of the write information (annotation) on the basis of the feature of the content image. Therefore, the user can more easily perform the write operation on the content image.

For example, the image analysis unit 112 obtains a content image (moving image) supplied from the content input unit 111, performs image analysis on each frame image of the moving image, and extracts the feature for each frame. Note that in a case where the moving image supplied from the content input unit 111 is a moving image that is to be encoded with inter-frame prediction, the image analysis may be performed only on the I frame as a processing target.

Note that the feature of the content image extracted by the image analysis unit 112 is discretionary. For example, it may be a histogram of the luminance of the content image or a feature point indicating the location of a characteristic pattern included in the content image. Furthermore, it may be a character recognition result. Of course, it may be other than these. Furthermore, the image analysis unit 112 may extract a plurality of types of features.

The image analysis unit 112 supplies, to the comparison unit 113, the feature (feature data) of the content image having been extracted. Furthermore, the image analysis unit 112 supplies the content image (moving image) to the output control unit 120.

The comparison unit 113 obtains feature data of a content image of the processing target supplied from the image analysis unit 112. Furthermore, the comparison unit 113 obtains feature data of the immediately preceding (of the previous processing target) content image from the immediately preceding content feature data retention unit 114.

Then, the comparison unit 113 compares those feature data. That is, the comparison unit 113 compares the feature of the content image of the processing target with the feature of the immediately preceding content image. By this comparison, it is possible to detect that the content image to be output has been switched (switched to a different pattern). In other words, the comparison unit 113 can also detect that the data of the content image to be output has been switched but its pattern has not changed.

For example, the comparison unit 113 may compare the histogram of luminance between the content image of processing target and the immediately preceding content image (in other words, compare the content image of processing target with the immediately preceding content image on the basis of the histogram of luminance). Furthermore, for example, the comparison unit 113 may compare a feature point indicating the location of a characteristic pattern included in the content image between the content image of processing target and the immediately preceding content image (in other words, compare the content image of processing target with the immediately preceding content image on the basis of the feature point). Furthermore, the comparison unit 113 may compare a plurality of types of features. For example, the comparison unit 113 may compare the histogram of luminance and the feature point between the content image of processing target and the immediately preceding content image (in other words, compare the content image of processing target with the immediately preceding content image on the basis of the histogram of luminance and the feature point). Thus, by comparing more various features, the comparison unit 113 can more accurately detect the switching of the content image to be output.

In other words, the comparison unit 113 can more accurately detect that the data of the content image to be output has been switched but its pattern has not changed.

Furthermore, the comparison unit 113 may compare the recognition result of a character included in the image between the content image of processing target and the immediately preceding content image (in other words, compare the content image of processing target with the immediately preceding content image on the basis of the recognition result of a character included in the image). For example, the comparison unit 113 may compare the character recognition result in addition to the comparison of the histogram of luminance and the feature point (in other words, compare the content image of processing target with the immediately preceding content image on the basis of the histogram of luminance, the feature point, and the character recognition result). By doing so, the comparison unit 113 can more accurately detect the switching of the content image to be output. Of course, the feature to be compared is discretionary and not limited to these examples.

Moreover, the comparison unit 113 may set the entire or a part of the content image as a comparison target range and compare the feature in the comparison target range. For example, in a case of a content image composed of a figure and text, the comparison unit 113 may set, as a comparison target range, a portion of the figure in which the write information is assumed to be imparted highly frequently, or may set, as a comparison target range, the entire content image including both the figure and text. By doing so, it is possible to exclude a region that is obviously unnecessary for comparison, and hence the comparison unit 113 can more easily perform the comparison (can suppress an increase in load).

In a case of setting a part of the content image as a comparison target range, the comparison unit 113 may set the comparison target range on the basis of the layout of the content image of processing target, for example. For example, in a case where a figure exists at the upper left of the content image and other regions are configured with text, the comparison unit 113 may set, as the comparison target range, the upper left region of the content image in which the figure exists on the basis of its layout. By doing so, it is possible to more easily set the comparison target range.

Furthermore, the comparison unit 113 may set the comparison target range on the basis of the learning result of the annotation impartment position, for example. For example, in a case where an annotation is highly likely to be imparted to the upper left region of the content image as a result of learning, the comparison unit 113 may set the upper left region of the content image as the comparison target range on the basis of the result of the learning. By doing so, it is possible to more accurately set the comparison target range.

Note that in a case where the features match, the comparison unit 113 controls the output control unit 120 to display the content image and the annotation (write information).

In a case where the features do not match, the comparison unit 113 supplies the feature data of the content image of processing target to the search unit 119 as the comparison result to search write information (annotation) corresponding to the feature of the content image of processing target. Therefore, the search unit 119 can search the write information corresponding to the content image of the new pattern in accordance with the switching of the content image to be output. That is, the annotation output control device 100 can control the output of the write information (annotation) in accordance with the switching of the content image to be output. Therefore, the user can more easily perform the write operation on the content image.

Furthermore, the comparison unit 113 controls the annotation control unit 116 to erase the output write information (annotation).

Furthermore, the comparison unit 113 controls the annotation control unit 116 to supply the data of the write information (also referred to as write data) to the association unit 117. Moreover, the comparison unit 113 supplies the feature data of the content image of processing target to the association unit 117. Furthermore, the comparison unit 113 supplies the feature data of the content image of processing target to the immediately preceding content feature data retention unit 114 to retain the feature data. In the processing for the next processing target, the comparison unit 113 reads and uses the feature data as the feature data of the immediately preceding content image.

Note that in the comparison between the feature of the content image of processing target described above and the feature of the immediately preceding content image, the comparison unit 113 may derive the similarity of the feature, i.e., the similarity between the pattern of the content image of processing target and the pattern of the immediately preceding content image, and determine, by threshold, the match/mismatch of the feature on the basis of the similarity. For example, the comparison unit 113 may determine that the features match in a case where the similarity is higher than a predetermined threshold, and may determine that the features do not match in a case where the similarity is equal to or lower than the threshold. By doing so, the comparison unit 113 can control the determination criterion as to whether or not the features match by setting the threshold, and can perform more flexible determination.

Therefore, for example, even if the feature of the content image of processing target does not exactly match the feature of the immediately preceding content image (even in a case where of a certain extent of similarity), the comparison unit 113 can determine that the features match. For example, it becomes possible to determine a halfwidth character string "ABCDEFG", a fullwidth character string "ABCDEFG", an intermittent character string "ABCDEFG", and the like to be the same character string. Therefore, the annotation output control device 100 can more appropriately perform the output control of the write information. Therefore, the user can more easily perform the write operation on the content image.

The immediately preceding content feature data retention unit 114 has a discretionary storage medium, obtains feature data of the content image of processing target supplied from the comparison unit 113, and retains it in the storage medium (stores it in the storage medium). Furthermore, in response to a request from the comparison unit 113 or the like, the immediately preceding content feature data retention unit 114 supplies, as the feature data of the immediately preceding content image, the feature data of the content image retained in the storage medium.

The annotation operation input unit 115 receives a write operation (also referred to as an annotation operation) by the user or the like. That is, the annotation operation input unit 115 detects the write operation and generates write data corresponding to the write operation.

The detection method of this write operation is discretionary. For example, the annotation operation input unit 115 may capture, by a camera or the like, a content image displayed on a display (or a content image projected onto a projection plane), and analyze the captured image, thereby detecting the write operation performed (or the write information input) by the user or the like. Furthermore, on the basis of a signal from the input device used by the user for the write operation, the annotation operation input unit 115 may detect the write operation performed (or the write information input) by the user or the like.

The annotation operation input unit 115 supplies the generated write data to the annotation control unit 116.

The annotation control unit 116 performs processing related to annotation. The processing related to annotation includes processing related to the obtainment of annotation, processing related to the display control of annotation, and processing related to the supply of annotation. For example, as the processing related to the obtainment of annotation, the annotation control unit 116 can obtain the write data supplied from the annotation operation input unit 115. Furthermore, the annotation control unit 116 can also obtain the write data supplied as a search result from the search unit 119. Furthermore, the annotation control unit 116 supplies write data to the learning unit 121, whereby the learning unit 121 can learn the write information (annotation), and the annotation control unit 116 can obtain the learning result.

As the processing related to the display control of annotation, for example, the annotation control unit 116 can control the output of the write information (annotation) by supplying the obtained write data to the output control unit 120 and outputting the write information.

Furthermore, in response to a request from the comparison unit 113 or the like, the annotation control unit 116 can also erase the write information (annotation) being output. For example, as the processing related to the display control of annotation, in a case where the feature of the image of processing target does not match the feature of the immediately preceding image, the annotation control unit 116 can perform control so as to erase the write information corresponding to the feature of the immediately preceding image from the output image. By doing so, for example, in a case where the content image is switched, the annotation control unit 116 can erase unnecessary write information without user's operation. Therefore, the user can more easily perform the write operation on the content image.

Furthermore, the annotation control unit 116 can correct the write information as necessary. For example, the annotation control unit 116 can straighten a line handwritten by the user (a line distorted in an attempt to draw a straight line) or can form a shape such as a polygon or a circle. That is, the annotation control unit 116 can update the write data. By doing so, it is possible to make the write information more readable (improve visibility). Therefore, the user can more easily perform the write operation on the content image.

Note that the annotation control unit 116 may use the learning result by the learning unit 121 to correct the write information. By doing so, the annotation control unit 116 can reflect, for example, the user's intention and the like in the correction of the write information. That is, the annotation control unit 116 can more appropriately correct the write information. Therefore, the user can more easily perform the write operation on the content image.

As the processing related to the supply of annotation, for example, the annotation control unit can supply the write data to the association unit 117 in response to a request from the comparison unit 113 or the like. Therefore, the write information can be associated with the feature of the content image. Furthermore, the annotation control unit 116 can supply the write data to the learning unit 121. Therefore, the learning unit 121 can learn the write information (annotation).

The association unit 117 associates the feature of the content image with write information (annotation). For example, the association unit 117 obtains feature data of the content image of processing target that is supplied from the comparison unit 113. Furthermore, the association unit 117 obtains the write data supplied from the annotation control unit 116.

The association unit 117 associates the feature of the content image of processing target indicated by the obtained feature data with the write information (annotation) indicated by the obtained write data, and generates write relevant information indicating the correspondence relationship. In other words, the association unit 117 associates the feature data with the write data by the write relevant information. That is, the write relevant information includes the associated feature data and write data. Of course, the write relevant information may associate the feature data with the write data using their identification information, and the feature data and the write data may be managed as data different from the write relevant information. Note that the frequency (data unit) of generating the write relevant information is discretionary. For example, the association unit 117 may generate write relevant information for each frame of the content image (moving image) of processing target. Furthermore, in a case where the content image (moving image) of processing target is a moving image to be encoded with inter-frame prediction, the association unit 117 may generate write relevant information for the I frame of the moving image.

The association unit 117 supplies the generated write relevant information to the write relevant information storage unit 118 and causes the write relevant information storage unit 118 to store it. For example, the association unit 117 supplies the write relevant information generated for each frame or for each I frame to the write relevant information storage unit 118 and causes the write relevant information storage unit 118 to store it. In that case, the association unit 117 may supply the difference of the write relevant information from the immediately preceding processing target frame (for example, the write relevant information associating the feature of the content image of a processing target frame with the difference of the write information from the immediately preceding processing target frame) to the write relevant information storage unit 118 and causes the write relevant information storage unit 118 to store it.

The write relevant information storage unit 118 has a discretionary storage medium, obtains write relevant information supplied from the association unit 117, and causes the storage medium to store it. For example, the write relevant information storage unit 118 stores the write relevant information for each frame of the content image (moving image) of processing target. Furthermore, for example, the write relevant information storage unit 118 stores the write relevant information for each I frame of the content image (moving image) of processing target that is a moving image to be encoded with inter-frame prediction. Note that the write relevant information storage unit 118 may store the difference of the write relevant information from the immediately preceding processing target frame.

Thus, by generating and storing the write relevant information, the search unit 119 can search the write information corresponding to the feature of the content image of processing target by using this write relevant information. Therefore, since the annotation output control device 100 can output the write information corresponding to the feature of the content image, the user can more easily perform the write operation on the content image.

Furthermore, by generating and storing the write relevant information for each frame, the search unit 119 can always search for the latest write information. Therefore, since the annotation output control device 100 can output the latest write information, the user can more easily perform the write operation on the content image.

Furthermore, by storing the difference from the previous frame, the write relevant information storage unit 118 can suppress an increase in the data amount to be stored. Therefore, it is possible to suppress an increase in the required storage capacity. Therefore, it is possible to suppress an increase in cost.

Furthermore, the write relevant information storage unit 118 supplies the write relevant information stored in the storage medium to the search unit 119 in response to a request from the search unit 119.

The search unit 119 performs processing related to the search of write information (write data). For example, when the search unit 119 obtains the feature data of the content image of processing target supplied as a comparison result from the comparison unit 113, the search unit 119 searches the write information (write data corresponding to the write information) corresponding to the obtained feature of the content image of processing target with reference to the write relevant information stored in the write relevant information storage unit 118. By doing so, as described above, the user can more easily perform the write operation on the content image.

Furthermore, at the time of the search, the search unit 119 may obtain the learning result (for example, learning result related to the user's behavior) supplied from the learning unit 121 and perform the search using the learning result. For example, in a case where the user erases the write information displayed on the basis of the feature of the content image, the write information is unnecessary, and there is a possibility that the user is required not to display the write information on the content image. Furthermore, there may be a case where even for the same content image, the user desires to display different write information depending on the situation. Since such possibility can be reflected in the search by learning the user's behavior, it is possible to search the write information more suitable for the user's intention. Therefore, since the necessity of deletion or update of the write information having been output is reduced, the user can more easily perform the write operation on the content image.

Then, in a case where the write information corresponding to the feature of the content image of processing target is found in the search, the search unit 119 obtains the write data corresponding to the write information from the write relevant information storage unit 118, supplies it to the annotation control unit 116, and supplies it to the output control unit 120. Moreover, the search unit 119 controls the output control unit 120 to output the write information superimposed on the content image of processing target.

On the other hand, in a case where the write information corresponding to the feature of the content image of processing target is not found, the search unit 119 does not supply the write data to the annotation control unit 116 but controls the output control unit 120 to output the content image. As a result, the write information (annotation) is not output, and only the content image is output.

The output control unit 120 performs processing related to display of the content image and write information. For example, the output control unit 120 obtains a content image (moving image) supplied from the image analysis unit 112. Furthermore, the output control unit 120 obtains the write data supplied from the annotation control unit 116. The output control unit 120 supplies the obtained content image, write data, and the like to a subsequent processing unit and the like to output them. For example, the output control unit 120 outputs the write information searched by the search unit 119 as an output image together with the content image of processing target. By doing so, since the annotation output control device 100 can output the write information corresponding to the content image, the user can more easily perform the write operation on the content image.

Note that in the present description, this "output" includes image display by a display, image projection by a projector, data recording to a storage medium, and supply to another device.

Furthermore, the output control unit 120 can process at least any one of the content image to be output and the write information. The content of this process is discretionary. For example, the output control unit 120 can highlight the write information and a part of the content image corresponding to the write information by performing expansion, color conversion, or the like. By doing so, for example, it is possible to perform output in accordance with the user's intention such as display with more emphasis on a portion of the content image that the user has indicated to be important by the write information.

Note that the output control unit 120 may further perform this process on the basis of the user's behavior (input operation and the like), the content of write information, the learning result about them, or the like. By doing so, it is possible to more accurately reflect the user's intention in this output control.

Note that the output control unit 120 can execute processing by being controlled by, for example, the comparison unit 113 or the search unit 119.

The learning unit 121 learns, by deep learning or the like, a discretionary matter such as the user's behavior, write information, and a search result. For example, the learning unit 121 can obtain a captured image of a display or a user. Furthermore, the learning unit 121 can obtain the write data supplied from the annotation control unit 116. Moreover, the learning unit 121 can obtain information regarding the search result from the search unit 119.

On the basis of such information, the learning unit 121 learns the user's behavior with respect to the control result (i.e., the search result by the search unit 119) of the write information (annotation), such as, for example, a behavior of erasing the write information displayed together with the content image on the basis of the result of search by the search unit 119 or a behavior of imparting new write information to the content image whose write information has been erased on the basis of the result of search by the search unit 119. Furthermore, the learning unit 121 can also learn the write operation performed by the user (for example, the content of the write information and the place where the write information is imparted). Moreover, the learning unit 121 can learn the information to be provided to the search unit 119. Of course, the learning unit 121 may learn any other matters.

The learning unit 121 supplies these learning results to the annotation control unit 116, the search unit 119, and the output control unit 120. Of course, the learning unit 121 may supply the learning results to any other processing unit. By reflecting such learning result in the processing, the annotation output control device 100 can more appropriately perform the processing related to the annotation output control. Therefore, the user can more easily perform the write operation on the content image.

Note that these processing units have a discretionary configuration. For example, each processing unit may be configured by a logic circuit that implements the above-described processing. Furthermore, each processing unit may implement the above-described processing by having, for example, a central processing unit (CPU), a read only memory (ROM), a random access memory (RAM), and the like and executing a program by using them. Of course, each processing unit may have both configurations, and implement a part of the above-described processing by a logic circuit and implement the other by executing a program. The configuration of each processing unit may be independent of each other, and for example, some processing units may implement a part of the above-described processing by a logic circuit, some other processing units may implement the above-described processing by executing a program, and yet some other processing units may implement the above-described processing by both the logic circuit and the execution of the program.

Control Example

Figure 3:
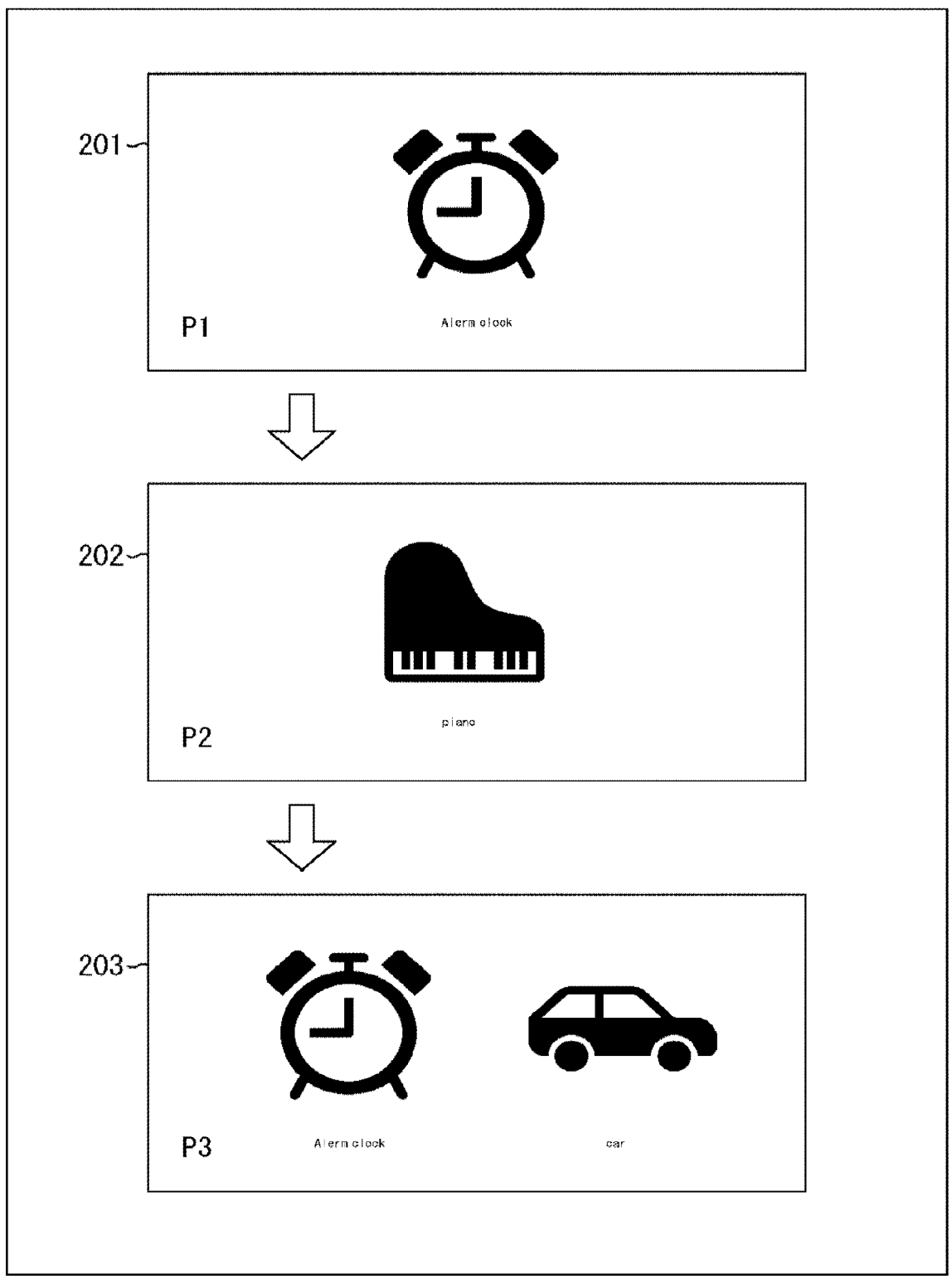
FIG. 3 is a view explaining an example of an image display.

As an example, a control example of annotation in a case where the content image to be displayed is switched as in a so-called slide show will be described. A content image 201, a content image 202, and a content image 203 are assumed to be sequentially displayed as shown in FIG. 3, for example.

Figure 4:
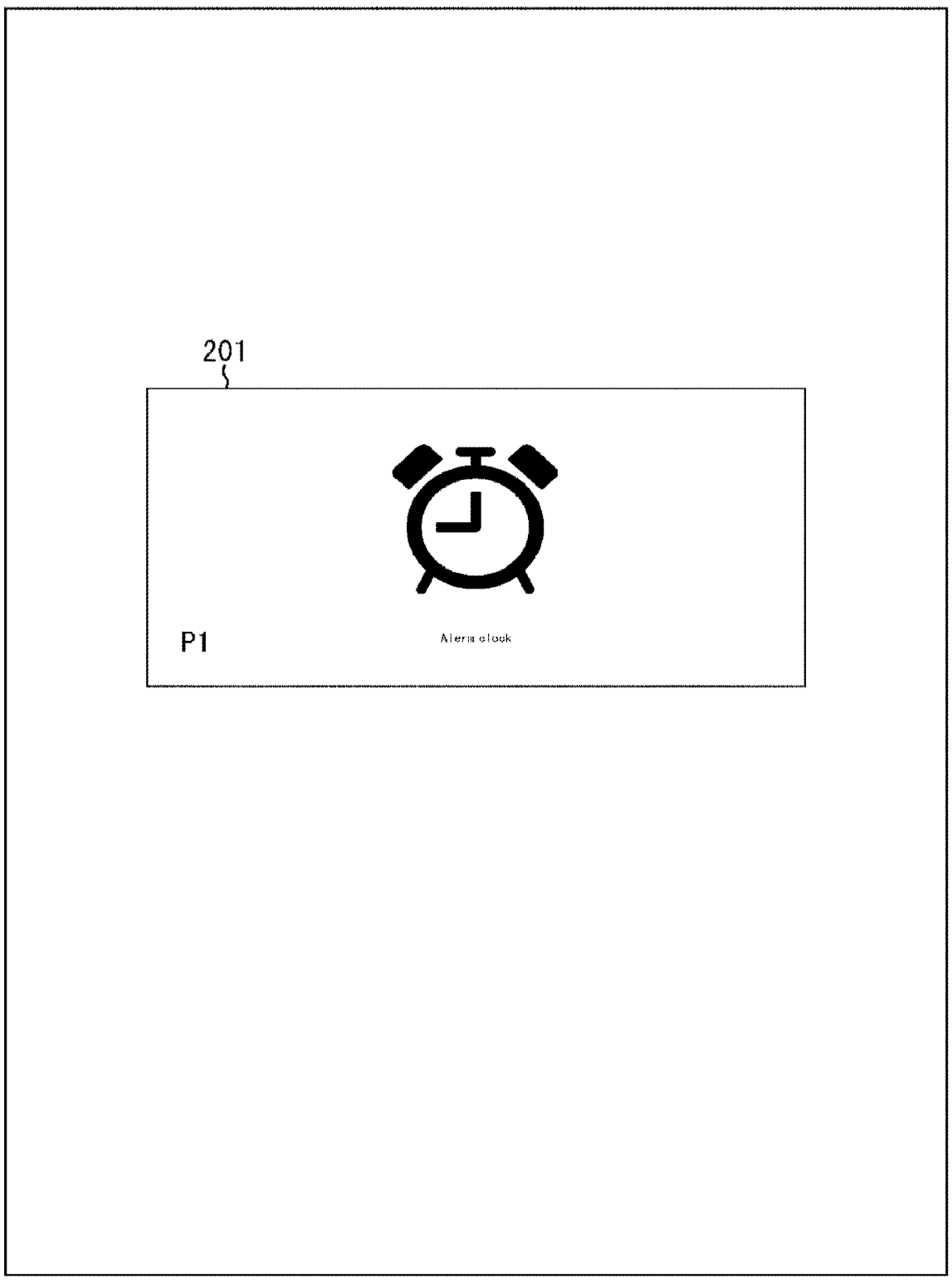
FIG. 4 is a view explaining an example of a processing target image.

As shown in FIG. 4, the first content image 201 includes a pattern of an alarm clock, and further includes a character string of "Alerm clock" below. The image analysis unit 112 analyzes the content image 201, and derives a feature point (also referred to as key point information (keyPoints_p1)) indicated by a circle in A of FIG. 5 and a histogram (hist_p1) of luminance indicated by a curve in B of FIG. 5.

Figure 6:
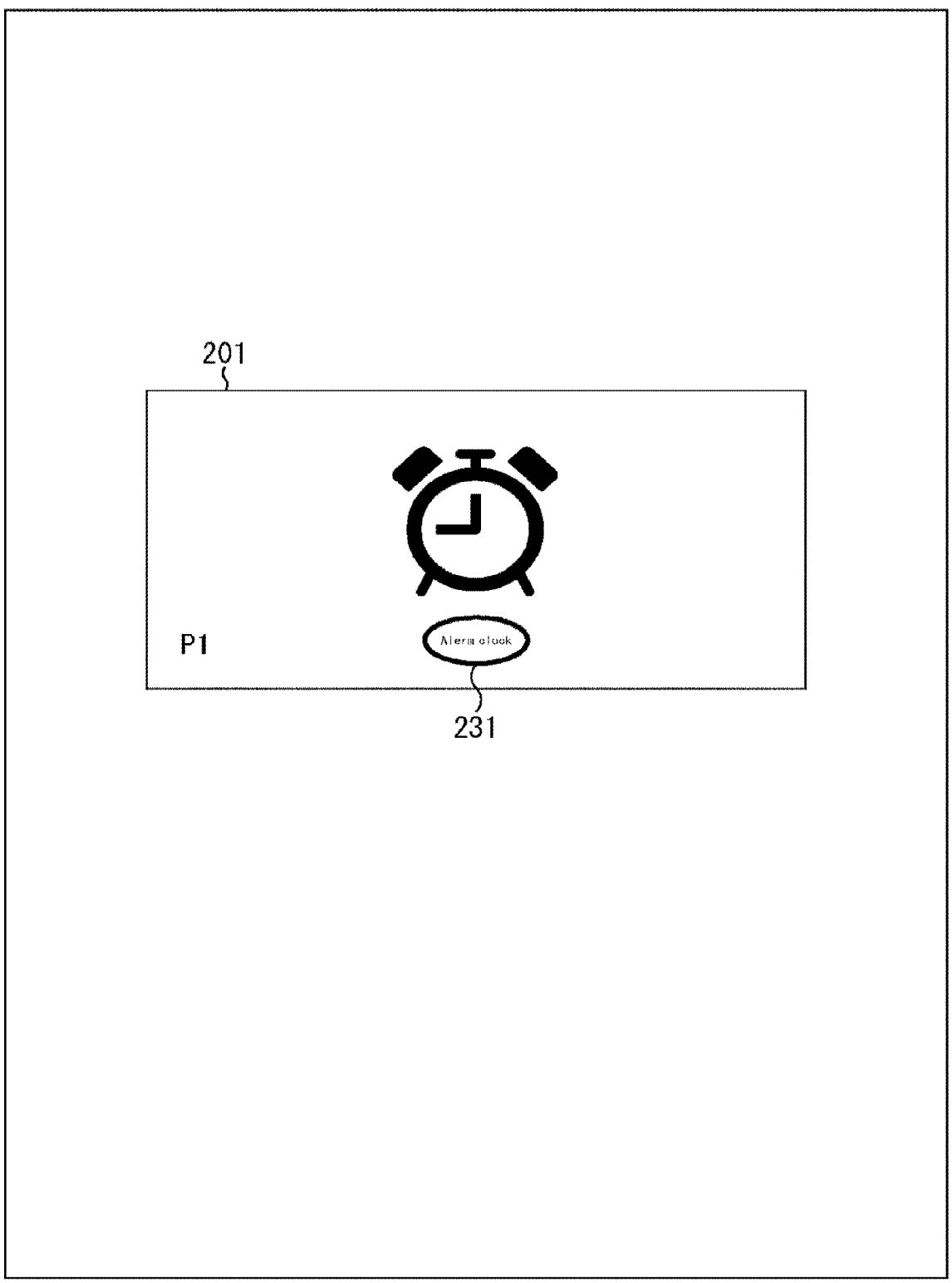
FIG. 6 is a view explaining an example of annotating.

As shown in FIG. 6, when the user inputs an annotation 231 (write information) surrounding the character string "Alerm clock" on the content image 201, the annotation operation input unit 115 detects it and supplies it to the annotation control unit 116. The annotation control unit 116 supplies the annotation 231 to the output control unit 120 to output it. As shown in FIG. 6, the output control unit 120 displays the annotation 231 superimposed on the content image 201.

The immediately preceding content feature data retention unit 114 retains feature data of the content image 201 for each frame.

Furthermore, the association unit 117 associates the annotation 231 with the feature (histogram (hist_p1) and key point information (keyPoints_p1)) of the content image 201, and stores it in the write relevant information storage unit 118 as write relevant information.

Next, the content image to be displayed is switched to the content image 202.

Figure 7:
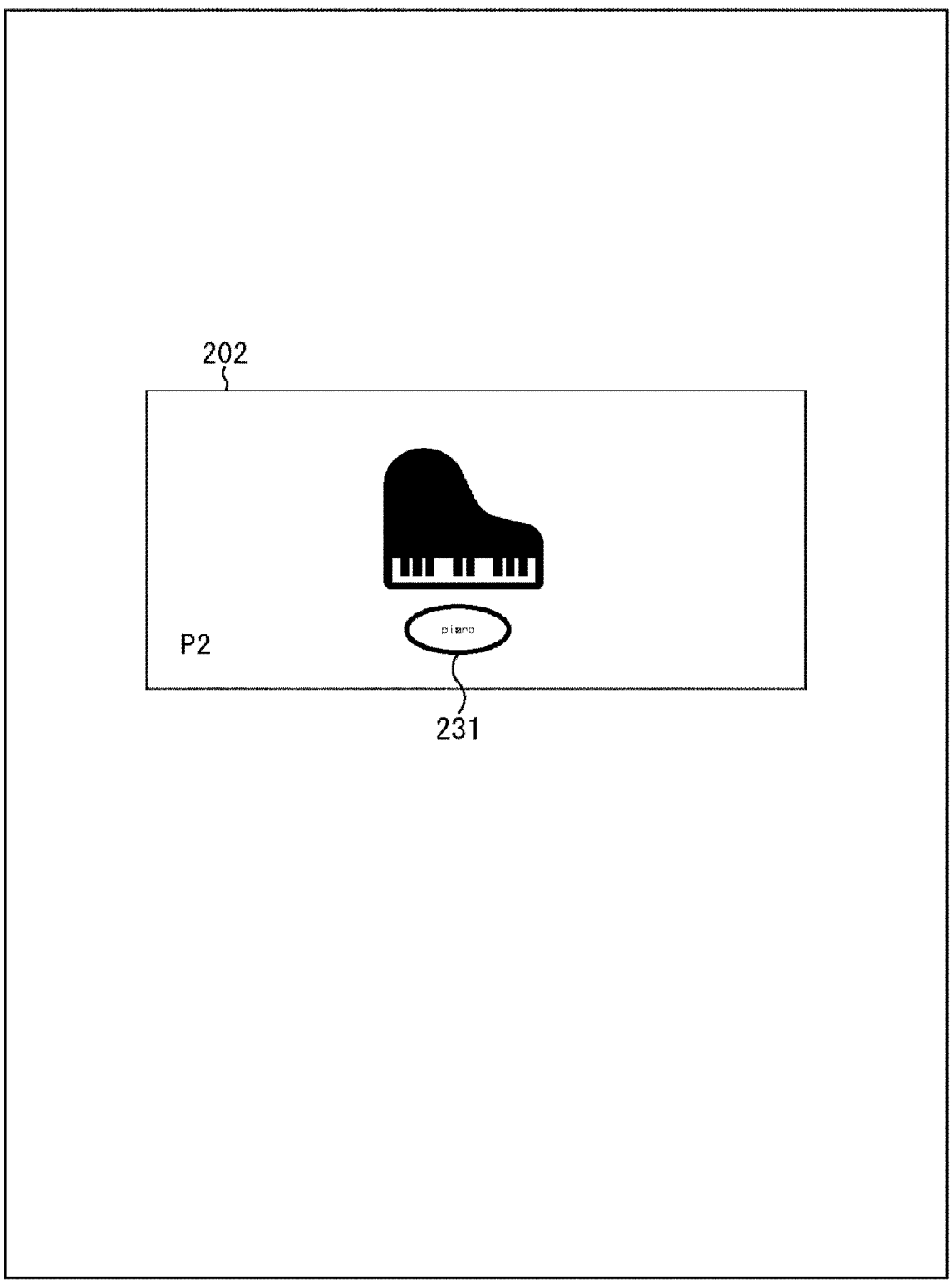
FIG. 7 is a view explaining an example of a processing target image.

As shown in FIG. 7, the content image 202 includes a pattern of a piano, and further includes a character string of "piano" below. The image analysis unit 112 analyzes the content image 202, and derives a feature point (also referred to as key point information (keyPoints_p2)) indicated by a circle in A of FIG. 8 and a histogram (hist_p2) of luminance indicated by a curve in B of FIG. 8.

Figure 5:
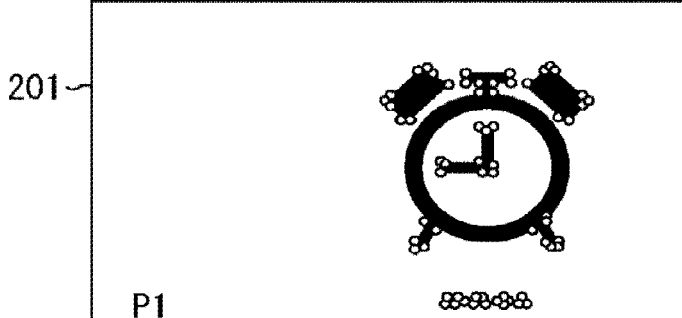
FIG. 5 is a view explaining an example of a feature of an image.
Figure 5:
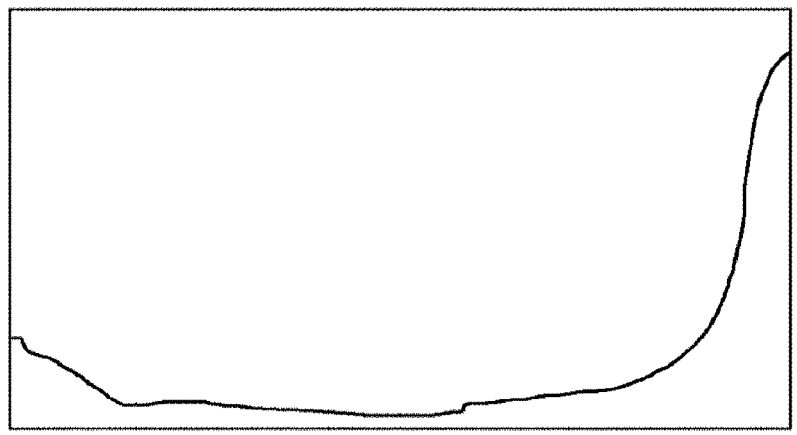
Figure 8:
FIG. 8 is a view explaining an example of a feature of an image.
Figure 8:
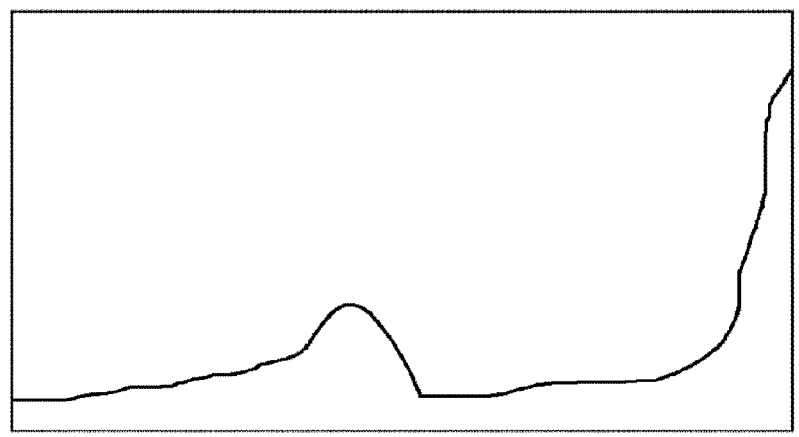

The comparison unit 113 compares the feature (feature point and histogram) of the content image 201 shown in FIG. 5 with the feature (feature point and histogram) of the content image 202 shown in FIG. 8. For example, the comparison unit 113 performs derivation of the Bhattacharyya distance (similarity) of the histogram and the oriented FAST and rotated BRIEF (ORB) matching.

Bhattacharyya_distance (hist_p2, hist_p1)=Similarity
ORB_matching (keyPoints_p2, keyPoints_p1)

Figure 9:
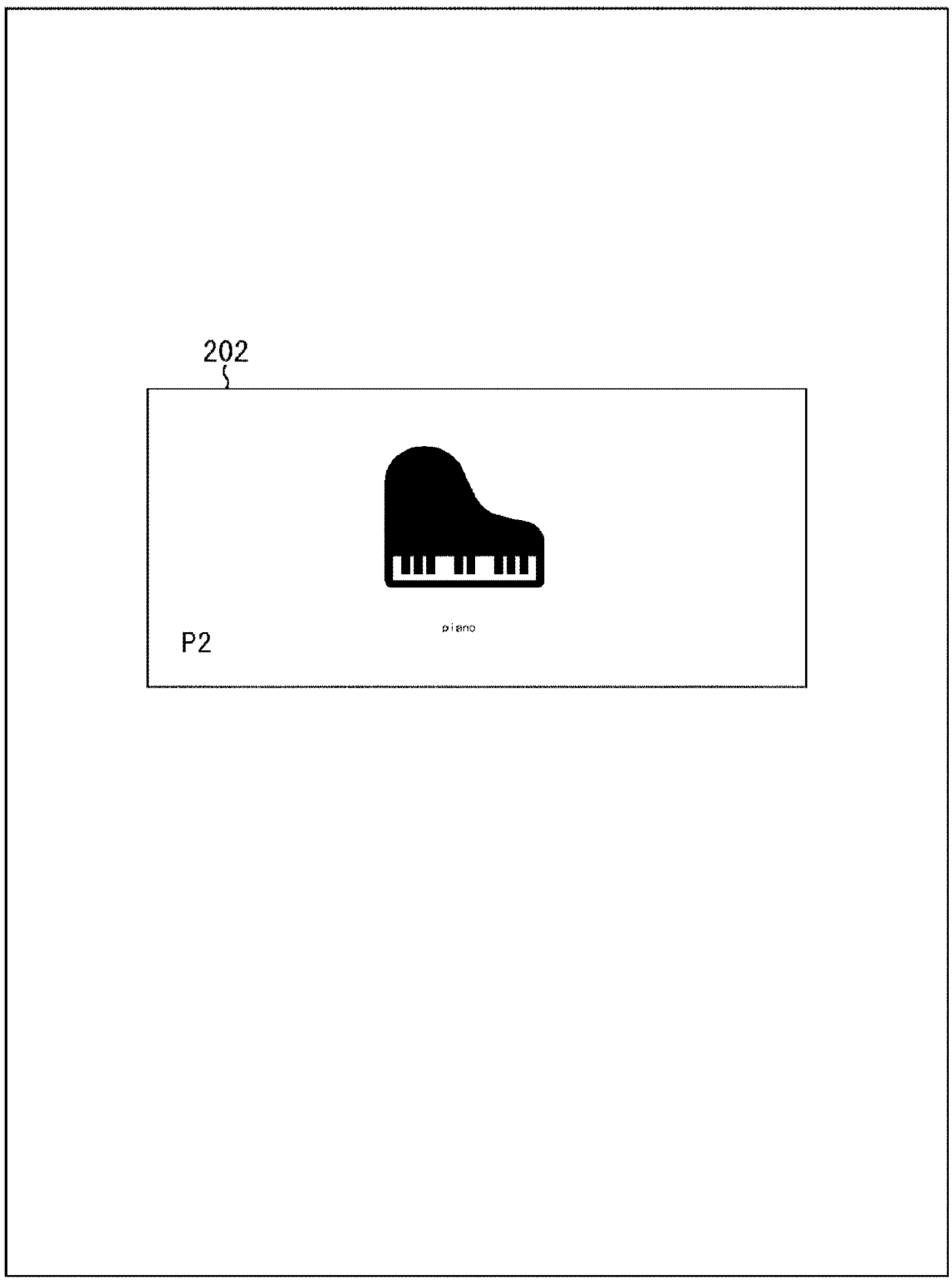
FIG. 9 is a view explaining an example of annotation deletion.

Since this comparison result is mismatch, the annotation control unit 116 erases the annotation 231 (write information). That is, only the content image 202 is displayed as shown in FIG. 9.

The search unit 119 searches the annotation corresponding to the feature (FIG. 8) of the content image 202 by using the write relevant information. In a case of this example, since such annotation does not exist (has not been found), the output control unit 120 displays only the content image 202 as shown in FIG. 9.

After the content image to be displayed is switched to the content image 202, the immediately preceding content feature data retention unit 114 retains the feature data of the content image 202 for each frame.

Next, the content image to be displayed is switched to the content image 203.

Figure 10:
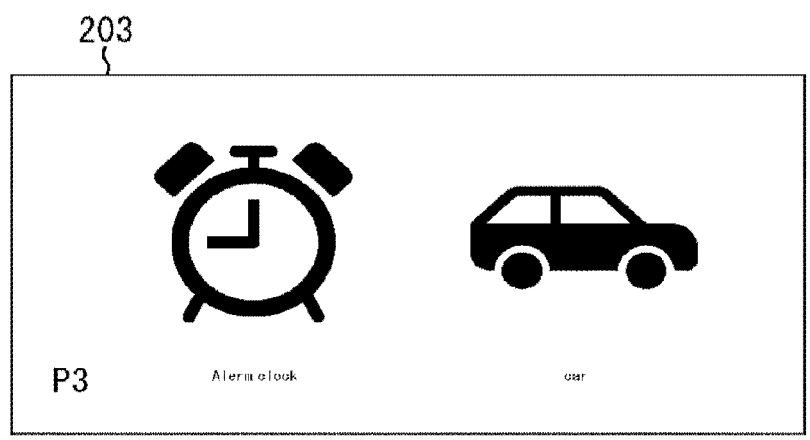
FIG. 10 is a view explaining an example of a processing target image.

As shown in FIG. 10, the content image 203 includes patterns of an alarm clock and a car, and further includes a character string of "Alerm clock" below the pattern of the alarm clock and a character string of "car" below the pattern of the car. The image analysis unit 112 analyzes the content image 203, and derives a feature point (also referred to as key point information (keyPoints_p3)) indicated by a circle in A of FIG. 11 and a histogram (hist_p3) of luminance indicated by a curve in B of FIG. 11.

Figure 11:
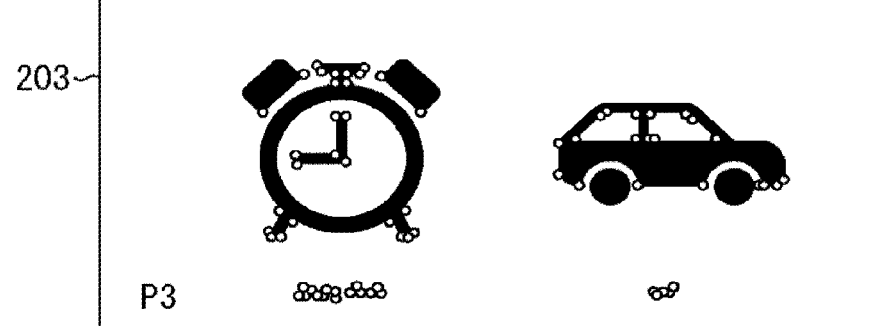
FIG. 11 is a view explaining an example of a feature of an image.
Figure 11:
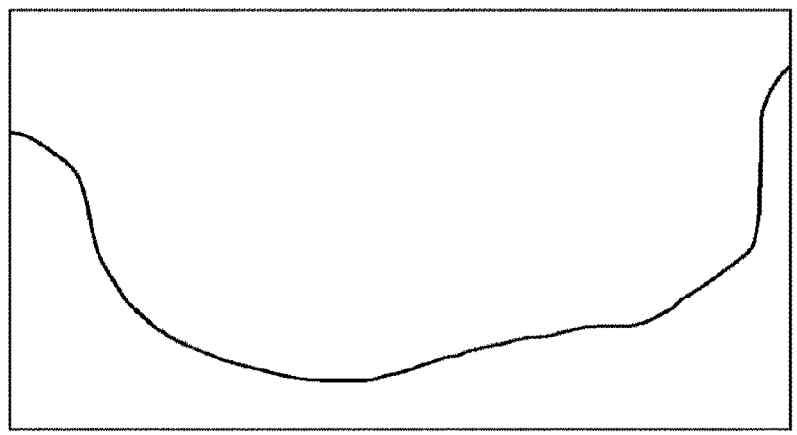

The comparison unit 113 compares the feature (feature point and histogram) of the content image 202 shown in FIG. 8 with the feature (feature point and histogram) of the content image 203 shown in FIG. 11. For example, the comparison unit 113 performs derivation of the Bhattacharyya distance (similarity) of the histogram and the ORB matching.

Bhattacharyya_distance (hist_p3, hist_p2)=Similarity 3-2
ORB_matching (keyPoints_p3, keyPoints_p2)
This comparison result is mismatch.

Therefore, the search unit 119 searches for the annotation corresponding to the feature (FIG. 11) of the content image 203 by using the write relevant information. For example, the comparison unit 113 performs derivation of the Bhattacharyya distance (similarity) of the histogram and the ORB matching between the feature of the content image 203 and each feature included in the write relevant information. For example, the search unit 119 performs derivation of the Bhattacharyya distance (similarity) of the histogram and the ORB matching between the content image 203 and the content image 201.

Bhattacharyya_distance (hist_p3, hist_p1)=Similarity 3-1
ORB_matching (keyPoints_p3, keyPoints_p1)

Figure 12:
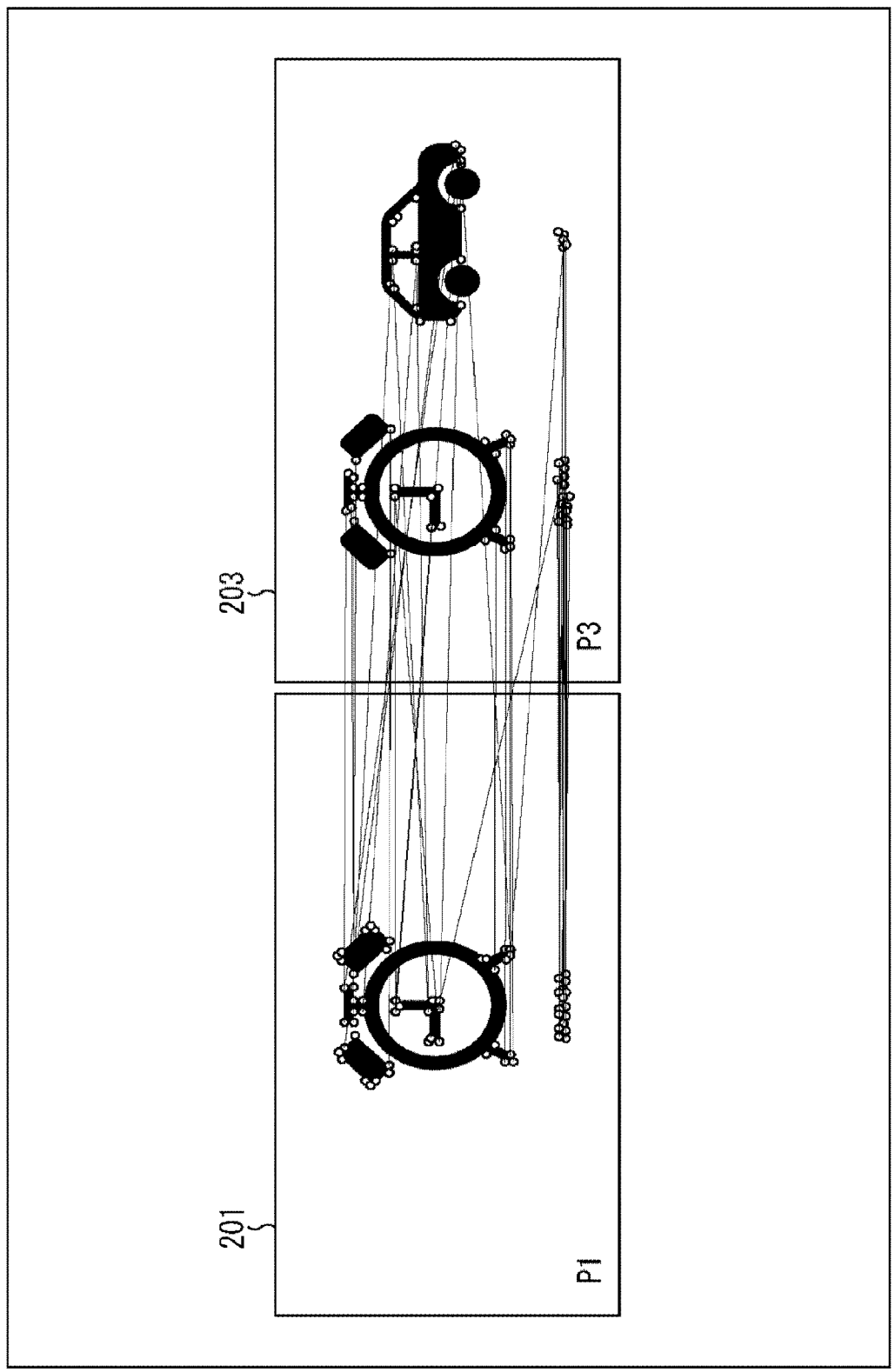
FIG. 12 is a view explaining an example of an annotation search.

FIG. 12 shows an example of the ORB matching between the content image 203 and the content image 201. Between the content image 203 and the content image 201, the similarity is low in the Bhattacharyya distance, but the similar content is detected by the ORB matching. That is, the pattern of the alarm clock and the character string "Alerm clock" below are common between the content image 203 and the content image 201.

Figure 13:
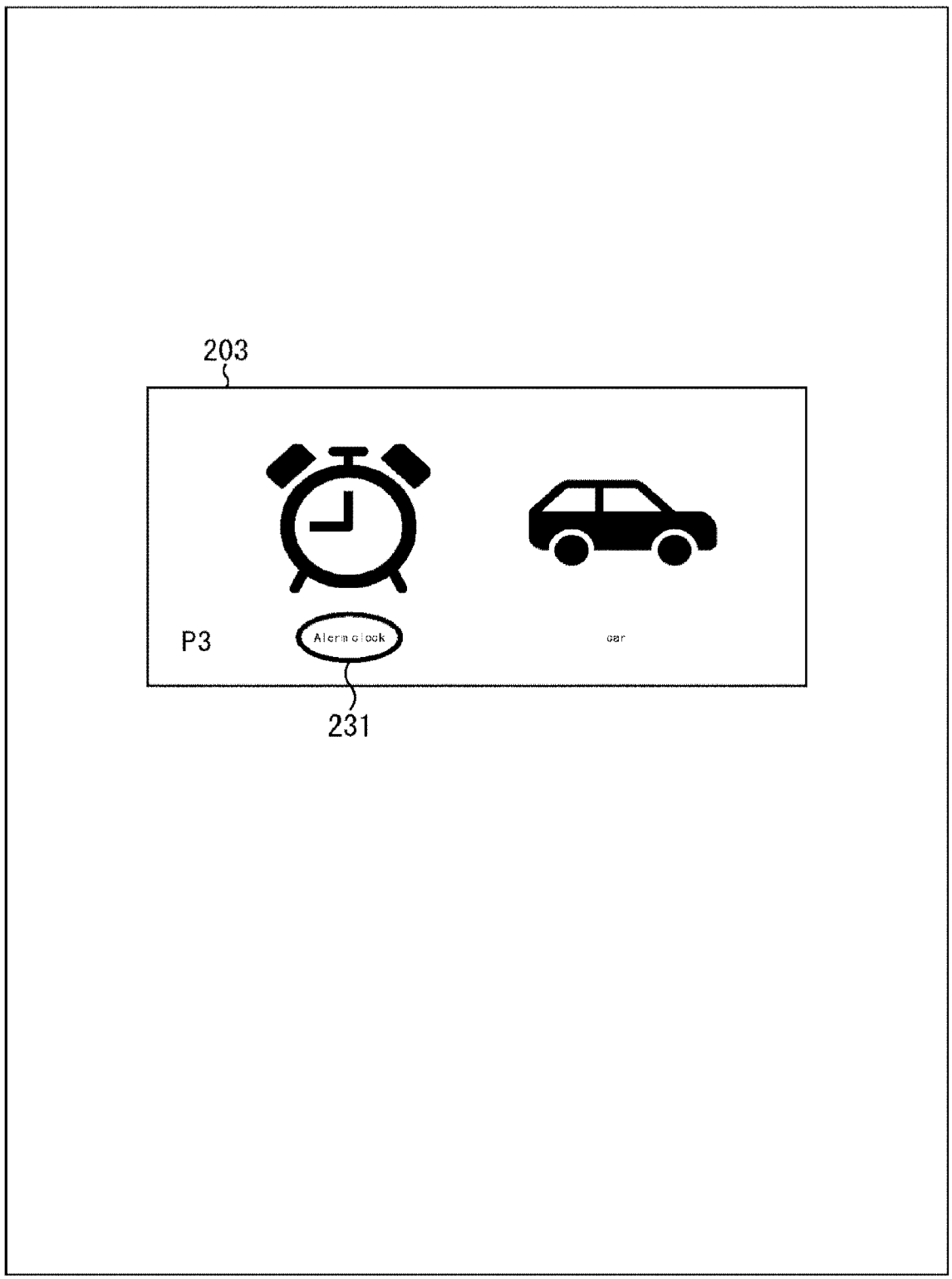
FIG. 13 is a view explaining an example of annotating.

On the basis of this search result, the annotation control unit 116 obtains the annotation 231, and supplies it to the output control unit 120 to output it. As shown in FIG. 13, the output control unit 120 displays the annotation 231 (write information) superimposed on the (position surrounding the character string "Alerm clock" of) the content image 203.

That is, the annotation 231 is superimposed on the content image 203 and displayed so that the relative position with respect to the pattern becomes similar to in a case where the annotation is superimposed on the content image 201 and displayed (coordinates do not necessarily match). Therefore, the annotation 231 is displayed on the content image 203 so as to have a similar meaning to that on the content image 201. Therefore, it is not necessary for the user to repeat a write operation on the content image 203 similar to the write operation performed on the content image 201. That is, the user can more easily perform the write operation on the content image.

Note that the association unit 117 associates the annotation 231 with the feature (histogram (hist_p3) and key point information (keyPoints_p3)) of the content image 203, and stores it in the write relevant information storage unit 118 as write relevant information.

Furthermore, after the content image to be displayed is switched to the content image 203, the immediately preceding content feature data retention unit 114 retains the feature data of the content image 203 for each frame.

Learning of User's Behavior

Figure 14:
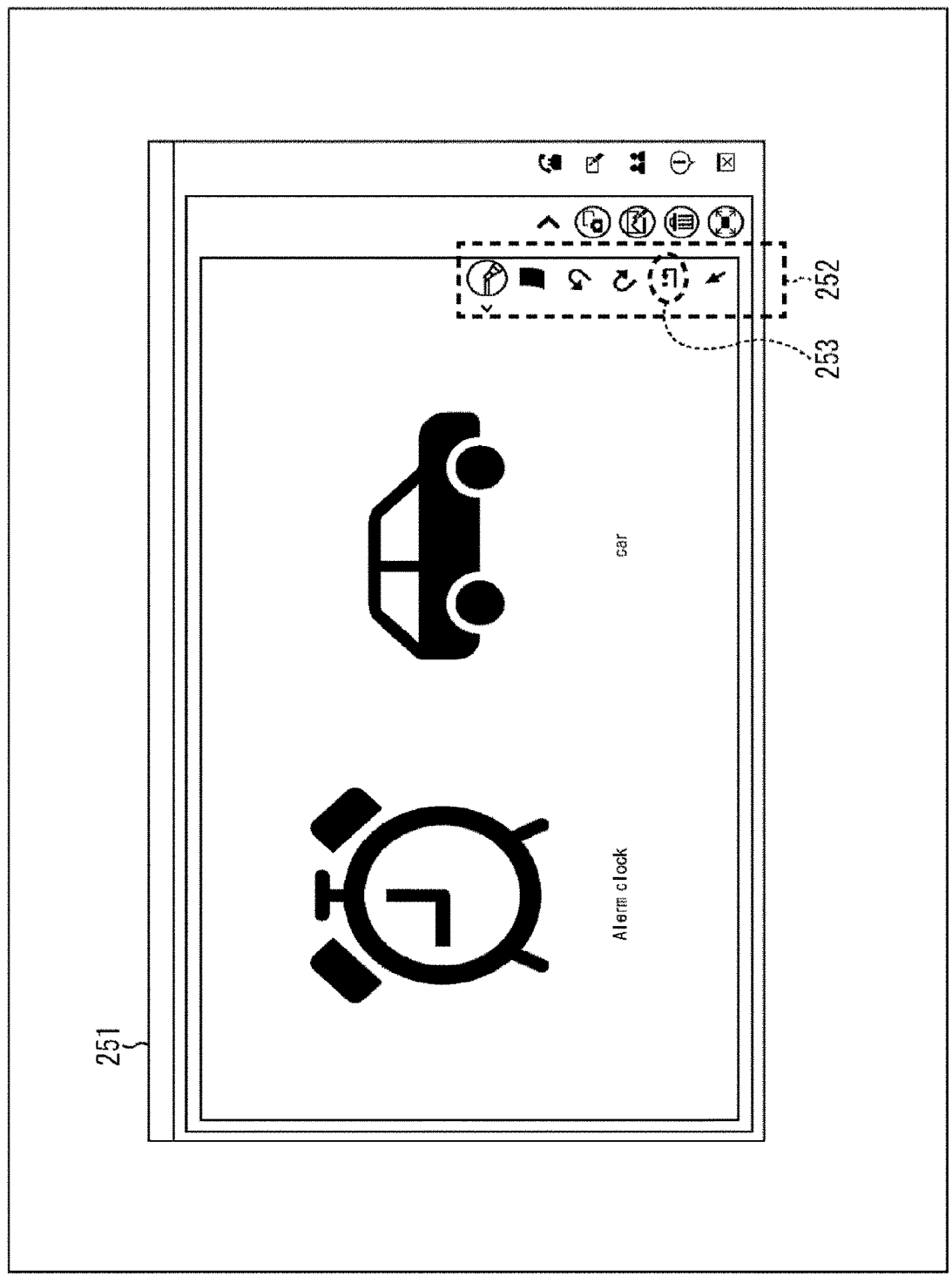
FIG. 14 is a view showing an example of a display screen.

Next, learning about user's behavior will be described. For example, it is assumed that a display image 251 including a content image as shown in FIG. 14 is displayed on the display. In a part of the display image 251 surrounded by a dotted line 252, an icon for annotation operation (write operation) is displayed. For example, an icon 253 surrounded by a dotted circle is a "delete-all icon", which is for collectively erasing annotations (write information) displayed on the display image 251 when operated by the user.

For example, it is assumed that the annotation output control device 100 searches an annotation corresponding to the feature of a content image and displays it on the display image 251 together with the content image. On the other hand, it is assumed that the user has erased all the annotations by operating the icon 253. In this case, it is considered that the user has erased the annotation associated with the feature of the content image because he/she judged that the annotation was unnecessary. The learning unit 121 learns such user's behavior, thereby learning the user's intention and reflecting it in each processing.

By doing so, the annotation output control device 100 can more appropriately perform output control of the annotation with respect to the user's intention. In a case of the above example, the annotation output control device 100 displays only the content image on the display image 251 without displaying the annotation even if the annotation corresponds to the feature of the content image. Therefore, the user does not need to operate the icon 253. Thus, the user can more easily perform the write operation on the content image.

Flow of Output Control Processing

Next, the processing executed by the annotation output control device 100 will be described. By executing the output control processing for each frame of the content image (moving image), the annotation output control device 100 performs the output control of the annotation (write information) as described above. An example of the flow of this output control processing will be described with reference to the flowcharts of FIGS. 15 and 16.

Figure 15:
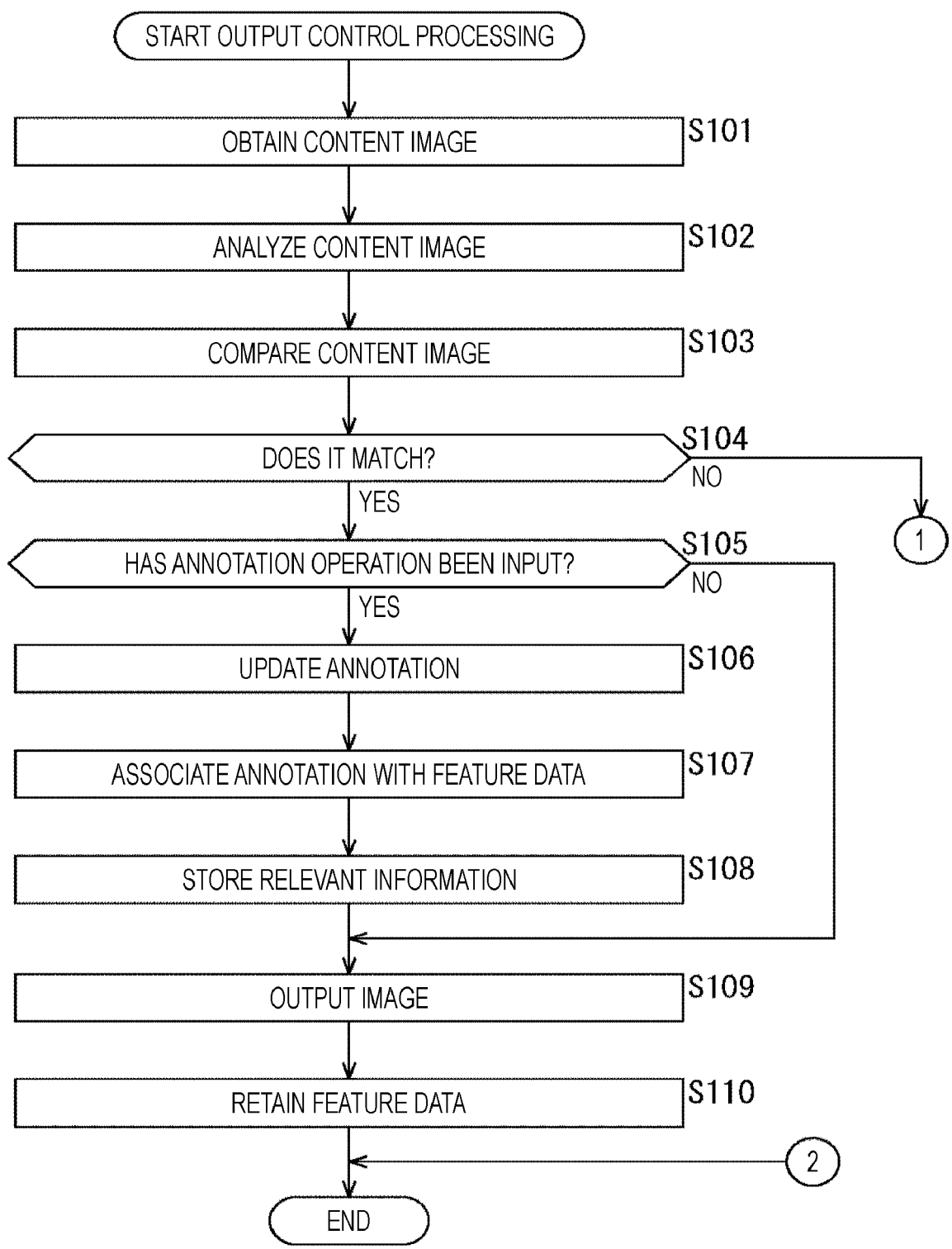
FIG. 15 is a flowchart explaining an example of the flow of output control processing.

When the output control processing is started, the content input unit 111 obtains, in step S101 of FIG. 15, a content image (frame image of processing target) to be displayed.

In step S102, the image analysis unit 112 analyzes the content image of processing target obtained in step S101 and extracts its feature.

In step S103, the comparison unit 113 compares the feature of the content image of processing target extracted in step S102 with the feature of the immediately preceding content image.

In step S104, the comparison unit 113 determines whether or not the feature of the content image of processing target matches the feature of the immediately preceding content image. In a case where they have been determined to match, the processing proceeds to step S105.

In step S105, the annotation operation input unit 115 determines whether or not an annotation operation has been input (i.e., whether or not a write operation has been performed). In a case where it is determined that the annotation operation has been input (i.e., the write operation has been performed), the processing proceeds to step S106.

In step S106, the annotation control unit 116 updates the annotation (write information) to be displayed in accordance with the input. That is, the annotation control unit 116 reflects the annotation operation in the display, and brings the display of the annotation to the latest state.

In step S107, the association unit 117 associates the latest annotation with the feature data of the content image of processing target, and generates write relevant information.

In step S108, the write relevant information storage unit 118 stores the write relevant information generated in step S107.

When the processing of step S108 ends, the processing proceeds to step S109. Furthermore, in a case where it is determined in step S105 that the annotation operation has not been input (i.e., no write operation has been performed), the processing proceeds to step S109.

In step S109, the output control unit 120 outputs the content image of processing target. Note that in a case where displaying the annotation, the output control unit 120 superimposes the annotation on the content image to output it.

In step S110, the immediately preceding content feature data retention unit 114 retains the feature data of the content image of processing target (frame image of processing target).

When the processing of step S110 ends, the output control processing ends.

Figure 16:
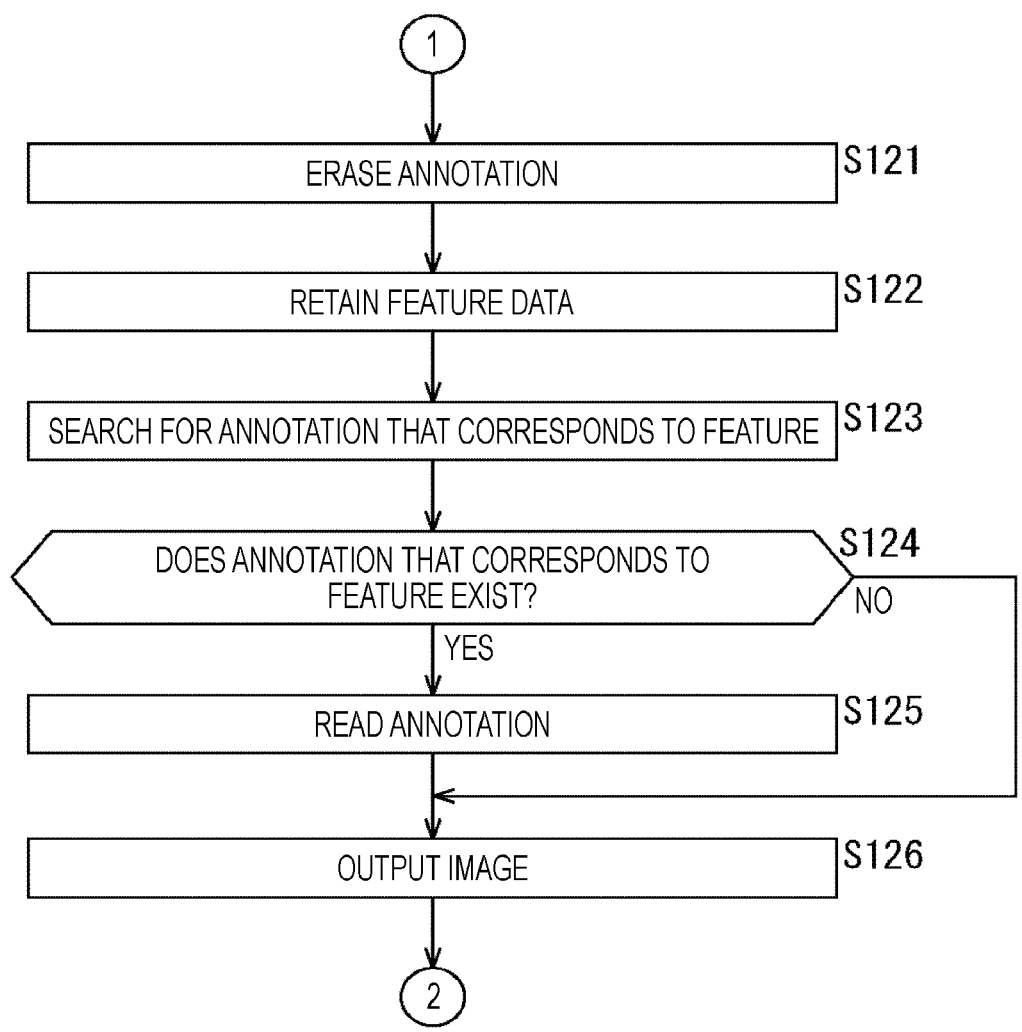
FIG. 16 is a flowchart following FIG. 15, explaining an example of the flow of the output control processing.

Furthermore, in a case where it is determined in step S104 that the feature of the content image of processing target does not match the feature of the immediately preceding content image, the processing proceeds to step S121 in FIG. 16.

In step S121 of FIG. 16, the annotation control unit 116 erases the displayed annotation.

In step S122, the immediately preceding content feature data retention unit 114 retains the feature data of the content image of processing target (frame image of processing target).

In step S123, the search unit 119 searches the annotation corresponding to the feature of the content image of processing target by using the write relevant information.

In step S124, the search unit 119 determines whether or not an annotation corresponding to the feature of the content image of processing target exists. In a case where it has been determined to exist (found), the processing proceeds to step S125.

In step S125, the annotation control unit 116 obtains the annotation corresponding to the feature of the content image of processing target from the search unit 119.

When the processing of step S125 ends, the processing proceeds to step S126. Furthermore, in a case where it has been determined in step S124 that the annotation corresponding to the feature of the content image of processing target does not exist (not found), the processing proceeds to step S126.

In step S126, the output control unit 120 outputs the content image of processing target. Note that in a case where displaying the annotation, the output control unit 120 superimposes the annotation on the content image to output it.

When the processing of step S126 ends, the processing returns to FIG. 15, and the output control processing ends.

By executing such output control processing for each frame of the content image (moving image), the annotation output control device 100 can perform the output control of the annotation in accordance with the feature of the content image. Therefore, the user can more easily perform the write operation on the content image.

Flow of Learning Processing

Figure 17:
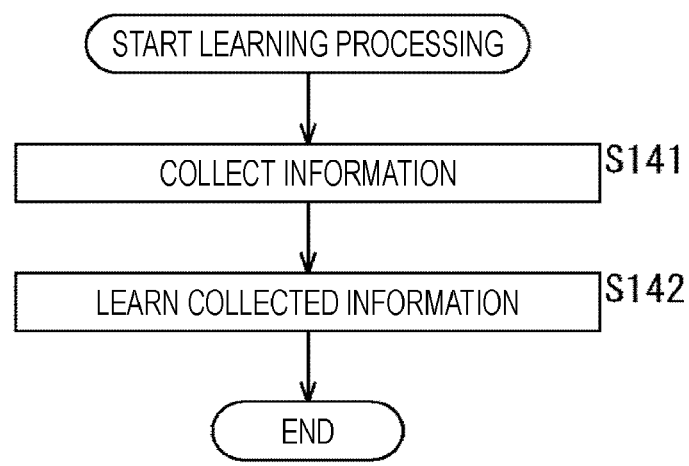
FIG. 17 is a flowchart explaining an example of the flow of learning processing.

Next, an example of the flow of the learning processing executed by the learning unit 121 will be described with reference to the flowchart of FIG. 17. This learning processing is appropriately executed at a discretionary timing.

When the learning processing is started, the learning unit 121 collects in step S141 information regarding items to be learned, such as the user's behavior.

In step S142, the learning unit 121 learns the information collected in step S141.

When the processing of step S142 ends, the learning processing ends.

The learning unit 121 thus executes the learning processing, whereby the annotation output control device 100 can more appropriately perform the processing related to the annotation output control. Therefore, the user can more easily perform the write operation on the content image.

3. Second Embodiment

Conference System

Figure 18:
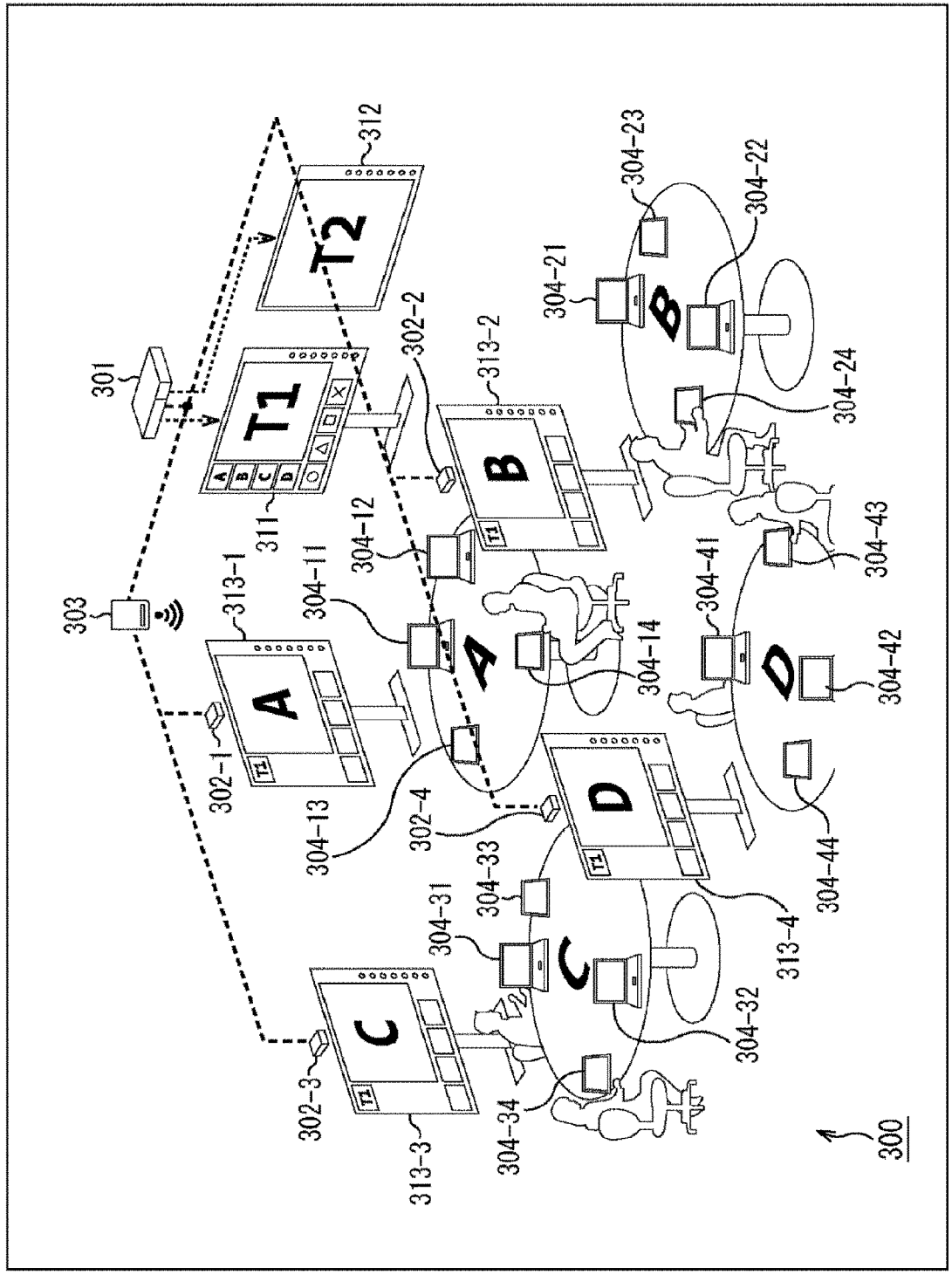
FIG. 18 is a view showing a main configuration example of a conference system.

FIG. 18 is a view showing an example of the configuration of a conference system that is an aspect of an information processing system to which the present technology is applied. A conference system 300 shown in FIG. 18 is a system that supports a conference, a deliberation, and the like held in a company, a university lecture, and the like, the system displaying a material image and the like to be used for the conference or deliberation on a display (projecting them onto a screen and the like), and receiving a write operation on the material image and displaying (projecting) write information corresponding to the write operation.

For example, users (participants in a conference or deliberation) are divided into groups referred to as pods. In a case of the example of FIG. 18, four pods of pods A to D are formed. Then, a discussion on a topic is held for each pod, and when the users reach a consensus for each pod, a presentation is given to all the users.

As shown in FIG. 18, the conference system 300 has a main unit 301, a pod unit 302-1 to a pod unit 302-4, a wireless router 303, a terminal device 304-11 to a terminal device 304-14, a terminal device 304-21 to a terminal device 304-24, a terminal device 304-31 to a terminal device 304-34, a terminal device 304-41 to a terminal device 304-44, a display 311, a display 312, and a display 313-1 to a display 313-4. Hereinafter, in a case where the pod units 302-1 to 302-4 do not need to be discriminated from one another when described, they are referred to as a pod unit 302. Furthermore, in a case where the terminal devices 304-11 to 304-14, the terminal devices 304-21 to 304-24, the terminal devices 304-31 to 304-34, and the terminal devices 304-41 to 304-44 do not need to be discriminated from one another when described, they are referred to as a terminal device 304. Moreover, in a case where the displays 313-1 to 313-4 do not need to be discriminated from one another when described, they are referred to as a display 313.

The main unit 301 performs processing related to control of each device of the conference system 300. For example, the main unit 301 performs the output control of annotation (write information).

The pod unit 302 performs processing related to control of each device in the pod to which the pod unit 302 itself corresponds.

The wireless router 303 constructs a wireless local area network (LAN) and realizes wireless communication among each device of the conference system 300.

Therefore, communication between the main unit 301 and each pod unit 302 as shown by a dotted line in FIG. 18, for example, is realized. Furthermore, communication among each pod unit 302 and each terminal device 304, for example, is realized. Moreover, communication among the main unit 301, each pod unit 302, each terminal device 304, and the displays 311 to 313, for example, is realized.

For example, the user of the pod A operates the terminal devices 304-11 to 304-14 to have a discussion in the pod A. The display 313-1 is used as a shared display for the pod A. The pod unit 302-1 controls the display of the display 313-1. For example, the pod unit 302-1 obtains a content image such as a material image supplied from the terminal devices 304-11 to 304-14, and displays the content image on the display 313-1.

The display 313-1 has an input device such as a touch screen or a camera, and receives an input operation by the user of the pod A. The pod unit 302-1 controls the display of the display 313-1 on the basis of the input operation. For example, the pod unit 302-1 selects a content image designated by the user from among the content images supplied from the terminal devices 304-11 to 304-14, and displays the content image on the display 313-1 in an enlarged manner.

Furthermore, the pod unit 302-1 perform output control of annotation to the display 313-1 by applying the present technology described above in <1. Management of annotation> and <2. First embodiment>. For example, the pod unit 302-1 receives, via the input device of the display 313-1, an annotation operation (write operation) on the content image displayed on the display 313-1, and displays, on the display 313-1, the annotation (write information) corresponding to the annotation operation superimposed on the content image. Furthermore, the pod unit 302-1 controls the display of annotation in accordance with the switching or the like of the content image to be displayed on the display 313-1.

By doing so, the user of the pod A can more easily perform the write operation on the image in the discussion in the pod A.

The similar processing to that in the pod A is performed for the pods B to D.

For example, the pod unit 302-2 obtains a content image such as a material image supplied from the terminal devices 304-21 to 304-24 for the user of the pod B, and displays the content image on the display 313-2 for the pod B. Furthermore, the pod unit 302-2 perform output control of annotation to the display 313-2 by applying the present technology described above in <1. Management of annotation> and <2. First embodiment>. By doing so, the user of the pod B can more easily perform the write operation on the image in the discussion in the pod B.

Furthermore, for example, the pod unit 302-3 obtains a content image such as a material image supplied from the terminal devices 304-31 to 304-34 for the user of the pod C, and displays the content image on the display 313-3 for the pod C. Furthermore, the pod unit 302-3 perform output control of annotation to the display 313-3 by applying the present technology described above in <1. Management of annotation> and <2. First embodiment>. By doing so, the user of the pod C can more easily perform the write operation on the image in the discussion in the pod C.

Moreover, for example, the pod unit 302-4 obtains a content image such as a material image supplied from the terminal devices 304-41 to 304-44 for the user of the pod D, and displays the content image on the display 313-4 for the pod D. Furthermore, the pod unit 302-4 perform output control of annotation to the display 313-4 by applying the present technology described above in <1. Management of annotation> and <2. First embodiment>. By doing so, the user of the pod D can more easily perform the write operation on the image in the discussion in the pod D.

The main unit 301 controls the display of the display 311 and the display 312. For example, by obtaining a content image from each pod unit 302, the main unit 301 can display, on the displays 311 and 312 as a content image, the material image (material image supplied from each terminal device 304) displayed on each display 313.

For example, in a case where the discussion in each pod ends and the content of the discussion is presented to all the others, the presenting user causes the display 311 and the display 312 to display, as the content image, the material image displayed on the display 313 of his/her own pod, and gives the presentation using the material image. When another user gives a presentation, the new presenting user gives a similar presentation by switching the material image to be displayed on the display 311 and the display 312.

The main unit 301 performs such display control by performing communication with each pod unit 302, the display 311, and the display 312.

Furthermore, similarly to the case of the display 313, the display 311 and the display 312 also have an input device such as a touch screen and a camera, and receive an input operation by the user. This input device allows, for example, the presenting user and a coordinating user (for example, a moderator, a teacher, a supervisor, an organizer, and the like) to perform a write operation on the material image displayed on the display 311 and the display 312.

The main unit 301 performs output control of annotation to the display 311 and the display 312 by applying the present technology described above in <1. Management of annotation> and <2. First embodiment>. For example, the main unit 301 receives, via the input device of the display 311 and the display 312, an annotation operation (write operation) on the content image displayed on the display 311 and the display 312, and displays, on the display, the annotation (write information) corresponding to the annotation operation superimposed on the content image. Furthermore, the main unit 301 controls the display of annotation in accordance with the switching or the like of the content image to be displayed on the display 311 and the display 312.

By doing so, the user can more easily perform the write operation on the image in the presentation to all the others or the like.

Main Unit

Figure 19:
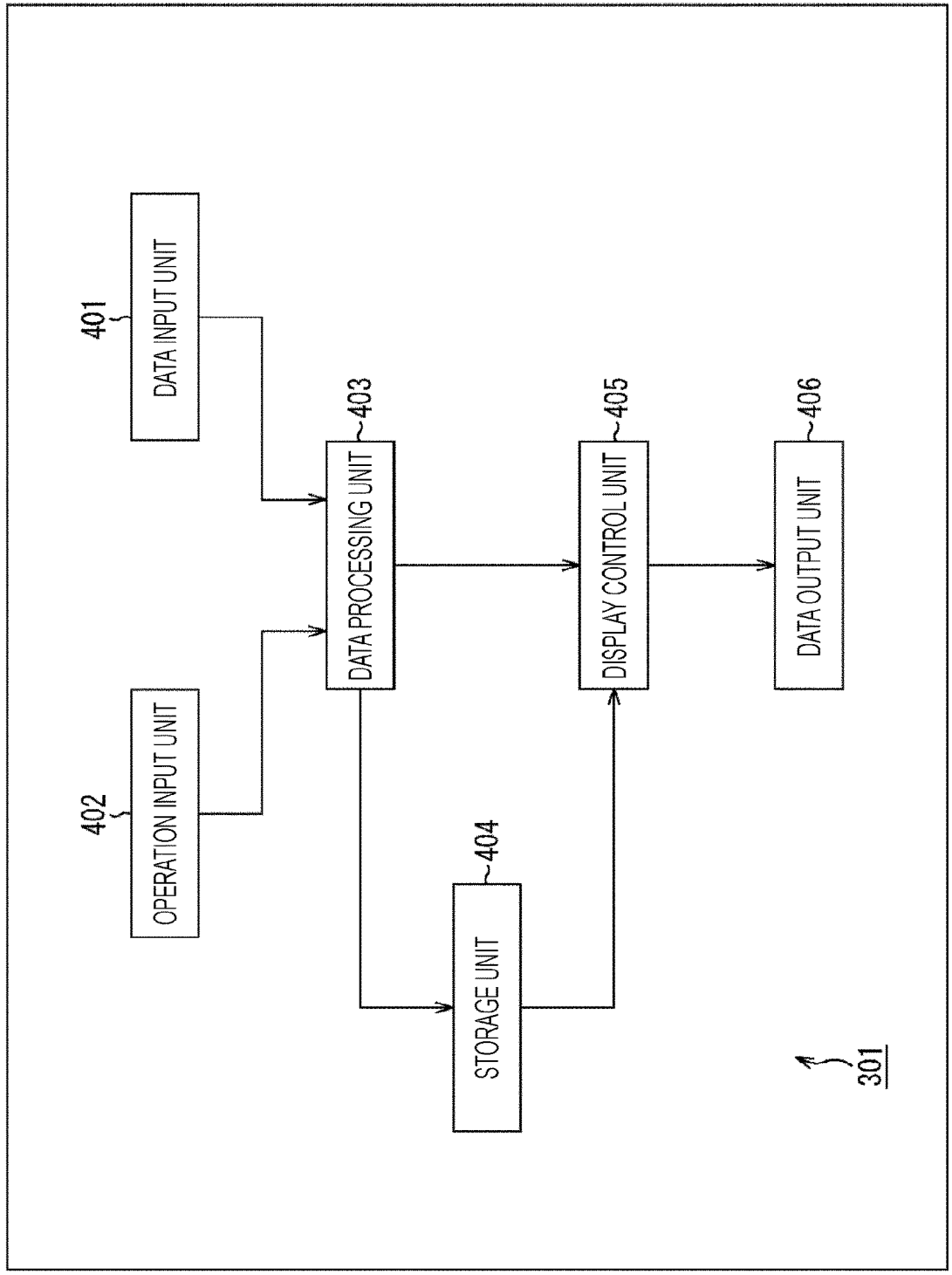
FIG. 19 is a block diagram showing a main configuration example of a main unit.

FIG. 19 is a block diagram showing a main configuration example of the main unit 301. As shown in FIG. 19, the main unit 301 has a data input unit 401, an operation input unit 402, a data processing unit 403, a storage unit 404, a display control unit 405, and a data output unit 406.

Note that FIG. 19 shows the main part of the processing unit, the flow of data, and the like, and FIG. 19 does not necessarily show all. That is, the main unit 301 may have a processing unit that is not shown as a block in FIG. 19, or may have a flow of processing or data that is not shown as an arrow or the like in FIG. 19.

The data input unit 401 has a device that receives data input, such as a communication interface, a drive, and an external input terminal. Using this device, the data input unit 401 obtains data (for example, content image and the like) supplied from the outside. The data input unit 401 supplies the obtained data to the data processing unit 403.

The operation input unit 402 has an input device such as a camera or a touch screen, for example, and receives an input operation (for example, write operation) by the user or the like. The operation input unit 402 supplies, to the data processing unit 403, information regarding the received input operation.

The data processing unit 403 performs information processing on data supplied from the data input unit 401 or the operation input unit 402. The content of this processing is discretionary. The data processing unit 403 supplies the processed data to the storage unit 404 to store and supplies it to the display control unit 405.

The storage unit 404 has a discretionary storage medium and stores data supplied from the data processing unit 403. Furthermore, the storage unit 404 supplies the data stored in the storage medium to the display control unit 405.

The display control unit 405 performs processing related to display control of the display 311 and the display 312 on the basis of, for example, data supplied from the data processing unit 403, data read from the storage unit 404, and the like. For example, the display control unit 405 has the function of the annotation output control device 100, and, similarly to the case of the annotation output control device 100, performs the output control of annotation by applying the present technology described above in <1. Management of annotation> and <2. First embodiment>. With this control, the user can more easily perform the write operation on the image. The display control unit 405 supplies the display image, its control information, and the like to the data output unit 406.

The data output unit 406 supplies the display image to the display 311 and the display 312 in accordance with the control information supplied from the display control unit 405, and displays the display image on the display 311 and the display 312.

As described above, since the main unit 301 performs the output control of annotation to which the present technology is applied, the user of the conference system 300 can more easily perform the write operation on the image.

Note that although the conference system 300 has been described above, the configuration of the conference system 300 is discretionary and is not limited to the example shown in FIG. 18. Furthermore, the output control of annotation to which the present technology is applied may be performed by, for example, the pod unit 302, or may be performed by the terminal device 304. Furthermore, the output control of annotation to which the present technology is applied may be performed by a device or the like, such as a server or a cloud, other than the configuration shown in FIG. 18.

Furthermore, the present technology can be applied to any device and system capable of performing a write operation (performing an annotation operation) on the displayed content image. For example, the present technology can be applied also to a conference call system in which a work area is shared and a write operation is performed on a material image shared by each user. Furthermore, the present technology can be applied also to a system in which, for example, a content image is projected onto a whiteboard and a pattern (a character, a shape, a symbol, and the like) physically drawn by the user with a pen or the like on the projected image (i.e., on the whiteboard) is managed as an annotation (write information).

4. Supplementary

Computer

The series of processing described above can be executed by hardware or can be executed by software. In a case where the series of processing is executed by software, a program configuring the software is installed in a computer. Here, the computer includes a computer incorporated in dedicated hardware and, for example, a general-purpose personal computer capable of executing various functions by installing various programs.

Figure 20:
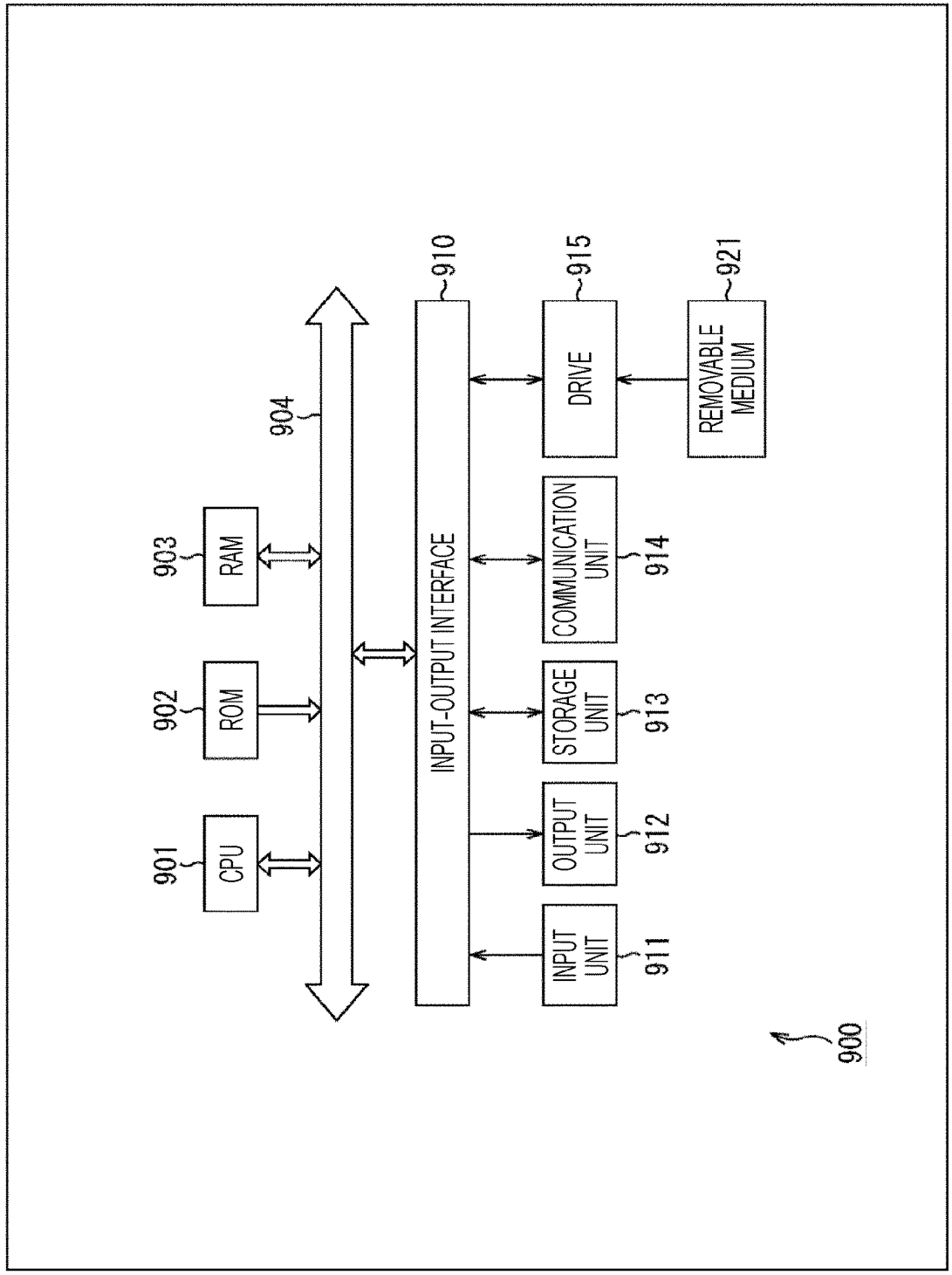
FIG. 20 is a block diagram showing a main configuration example of a computer.

FIG. 20 is a block diagram showing a configuration example of hardware of a computer that executes the above-described series of processing by a program.

In a computer 900 shown in FIG. 20, a central processing unit (CPU) 901, a read only memory (ROM) 902, and a random access memory (RAM) 903 are interconnected via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch screen, and an input terminal. The output unit 912 includes, for example, a display, a speaker, and an output terminal. The storage unit 913 includes, for example, a hard disk, a RAM disk, and a nonvolatile memory. The communication unit 914 includes, for example, a network interface. The drive 915 drives a removable medium 921 such as a magnetic disk, an optical disk, a magneto-optical disk, or a semiconductor memory.

In the computer configured as described above, the CPU 901 loads a program stored in, for example, the storage unit 913 via the input/output interface 910 and the bus 904 into the RAM 903 and executes the program, thereby performing the series of processing described above. Furthermore, the RAM 903 appropriately stores data necessary for the CPU 901 to execute various types of processing.

The program executed by the computer can be applied by being recorded in the removable medium 921 as a package medium, for example. In that case, by mounting the removable medium 921 to the drive 915, the program can be installed to the storage unit 913 via the input/output interface 910.

Furthermore, this program can also be provided via a wired or wireless transmission medium, such as a local area network, the Internet, or a digital satellite broadcast. In that case, the program can be received by the communication unit 914 and installed in the storage unit 913.

Other than that, this program can be installed in advance in the ROM 902 or the storage unit 913.

Application Target of Present Technology

Furthermore, the present technology can be applied to a discretionary configuration. For example, the present technology can also be implemented as a configuration of a part of a device such as a processor (for example, a video processor) as a system large scale integration (LSI), a module (for example, a video module) using a plurality of processors, a unit (for example, a video unit) using a plurality of modules, or a set (for example, a video set) in which other functions are further added to the unit.

Furthermore, for example, the present technology can be applied also to a network system configured by a plurality of devices. For example, the present technology may be implemented as cloud computing, in which is the present technology is shared and jointly processed by a plurality of devices via a network. For example, the present technology may also be implemented in a cloud service that provides a service related to an image (moving image) on a discretionary terminal such as a computer, audio visual (AV) equipment, a portable information processing terminal, and an Internet of Things (IoT) device.

Note that in the present description, the system means a set of a plurality of components (devices, modules (parts), and the like), and it does not matter whether or not all the components are in a same housing. Therefore, both a plurality of devices accommodated in separate housings and connected via a network, and a single device where a plurality of modules is accommodated in a single housing are systems.

Fields and Uses to which the Present Technology is Applicable

Systems, devices, processing units, and the like to which the present technology is applied can be used in any field such as, for example, transportation, medical treatment, crime prevention, agriculture, livestock industry, mining, beauty, factories, home appliances, weather, nature monitoring, and the like. Furthermore, its use is also discretionary.

Others

The embodiment of the present technology is not limited to the above-described embodiments, and various modifications can be made in a scope without departing from the gist of the present technology.

For example, the configuration described as one device (or processing unit) may be divided into a plurality of devices (or processing units). On the contrary, the configuration described above as a plurality of devices (or processing units) may be collectively configured as a single device (or processing unit). Furthermore, a configuration other than that described above may be added to the configuration of each device (or each processing unit). Moreover, a part of the configuration of a device (or processing unit) may be included in the configuration of another device (or another processing unit) if the configuration and operation as the entire system are substantially the same.

Furthermore, for example, the program described above may be executed in a discretionary device. In that case, the device is only required to have a necessary function (functional block and the like) and obtain necessary information.

Furthermore, for example, each step of one flowchart may be executed by one device, or may be executed by a plurality of devices in a shared manner. Moreover, in a case where a plurality of processing is included in one step, the plurality of processing may be executed by one device, or may be executed by a plurality of devices in a shared manner. In other words, a plurality of processing included in one step may be executed as processing of a plurality of steps. On the contrary, the processing described as a plurality of steps may be collectively executed as one step.

Furthermore, for example, in the program executed by the computer, the processing of the step describing the program may be executed in time series in the order described in the present description, or may be executed in parallel or individually at a necessary timing such as when a call is made. That is, as long as there is no contradiction, the processing of each step may be executed in a different order from the order described above. Moreover, the processing of the step describing the program may be executed in parallel with the processing of another program or may be executed in combination with the processing of another program.

Furthermore, for example, a plurality of technologies related to the present technology can be implemented independently of each other as long as there is no contradiction. Of course, a plurality of discretionary present technologies may be implemented in combination. For example, some or all of the present technologies described in any embodiment can be implemented in combination with some or all of the present technologies described in another embodiment. Furthermore, some or all of the discretionary present technologies described above can be implemented in combination with another technology not described above.

Note that the present technology can have the following configuration.

(1) An image processing device including:
a search unit that searches write information corresponding to a feature of an image of processing target on the basis of relevant information that associates the write information with the feature of the image.

(2) The image processing device according to (1) further including:
a learning unit that learns a user's behavior with respect to a search result by the search unit, in which
the search unit further searches write information corresponding to a feature of an image of the processing target on the basis of a learning result of the user's behavior by the learning unit.

(3) The image processing device according to (2), in which
the user's behavior includes a behavior of erasing write information displayed together with an image of the processing target on the basis of a result of a search by the search unit, and a behavior of adding write information on an image of the processing target.

(4) The image processing device according to any of (1) to (3) further including:
an output control unit that outputs, as an output image together with an image of the processing target, write information searched by the search unit.

(5) The image processing device according to (4), in which
the output control unit performs a process on at least any one of an image of the processing target to be output and the write information.

(6) The image processing device according to any of (1) to (5) further including:
an annotation processing unit that performs processing related to display control of write information on an image of the processing target.

(7) The image processing device according to (6), in which
as processing related to the display control, in a case where a feature of an image of the processing target does not match a feature of an immediately preceding image, the annotation processing unit performs control so as to erase write information corresponding to a feature of the immediately preceding image from an output image.

(8) The image processing device according to (6) or (7), in which
as processing related to the display control, the annotation processing unit corrects write information.

(9) The image processing device according to any of (1) to (8) further including:
an association unit that associates write information to be output together with an image of the processing target with a feature of an image of the processing target to generate the relevant information; and
a storage unit that stores the relevant information generated by the association unit.

(10) The image processing device according to (9), in which
the association unit generates the relevant information for each frame.

(11) The image processing device according to (9) or (10), in which the storage unit stores a difference of the relevant information from a previous frame.

(12) The image processing device according to any of (1) to (11) further including:
a comparison unit that compares a feature of an image of the processing target with a feature of an immediately preceding image, in which
in a case where the comparison unit determines that a feature of an image of the processing target does not match a feature of the immediately preceding image, the search unit searches write information corresponding to a feature of an image of the processing target.

(13) The image processing device according to (12), in which
the comparison unit compares an image of the processing target with the immediately preceding image on the basis of a histogram and a feature point of an image.

(14) The image processing device according to (13), in which
the comparison unit further compares an image of the processing target with the immediately preceding image on the basis of a recognition result of a character included in the image.

(15) The image processing device according to any of (12) to (14), in which
the comparison unit sets an entire or a part of an image of the processing target as a comparison target range, and compares a feature in the comparison target range with the immediately preceding image.

(16) The image processing device according to (15), in which
the comparison unit sets the comparison target range on the basis of a layout of an image of the processing target.

(17) The image processing device according to (15) or (16), in which
the comparison unit sets the comparison target range on the basis of a learning result of an impartment position of write information.

(18) The image processing device according to any of (12) to (17) further including:
an image analysis unit that analyzes an image of the processing target and extracts a feature of the image, in which
the comparison unit compares a feature of an image of the processing target extracted by the image analysis unit with a feature of the immediately preceding image, and
the search unit searches write information corresponding to a feature of an image of the processing target extracted by the image analysis unit.

(19) An image processing method including:
searching for write information corresponding to a feature of an image of processing target on the basis of relevant information that associates the write information with the feature of the image.

(20) A program that causes a computer to function as
a search unit that searches for write information corresponding to a feature of an image of processing target on the basis of relevant information that associates the write information with the feature of the image.

REFERENCE SIGNS LIST

100 Annotation output control device
111 Content input unit
112 Image analysis unit
113 Comparison unit
114 Immediately preceding content feature data retention unit
115 Annotation operation input unit
116 Annotation control unit
117 Association unit
118 Write relevant information storage unit
119 Search unit
120 Output control unit
121 Learning unit
300 Conference system
301 Main unit
302 Pod unit
303 Wireless router
304 Terminal device
311 to 313 Display
405 Display control unit

The invention claimed is:

1. An image processing device, comprising:
processing circuitry configured to
display, on a display, an image of a sequence of maces, the image having a first feature;
compare stored data of the first feature with features of an immediately preceding image in the sequence of images;
in response to determining that the first feature of the image does not match any of the features of the immediately preceding image, search for first write information corresponding to the first feature, based on stored relevant information that associates write information with a corresponding feature; and
display, on the display together with the image, the first write information corresponding to the first feature when the first write information is obtained from the search.

2. The image processing device according to claim 1, wherein the processing device is further configured to:
learn a behavior of a user with respect to a search result of the search, and
search for the first write information corresponding to the first feature of the image based on a learning result of the behavior of the user.

3. The image processing device according to claim 2, wherein the behavior of the user includes a behavior of erasing write information displayed together with the image based on a result of the search, and a behavior of adding write information on the image.

4. The image processing device according to claim 1, wherein the processing circuitry is further configured to perform a process on at least any one of the image to be output and the first write information.

5. The image processing device according to claim 1, wherein the processing circuitry is further configured to perform processing related to display control of the first write information superimposed on the image.

6. The image processing device according to claim 5, wherein, as the processing related to the display control, when the first feature of the image does not match any features of the immediately preceding image, the processing circuitry is further configured to perform control so as to erase second write information corresponding to a second feature of the immediately preceding image.

7. The image processing device according to claim 5, wherein, as the processing related to the display control, the processing circuitry is further configured to correct the first write information.

8. The image processing device according to claim 1, wherein the processing circuitry is further configured to associate certain write information to the output together with a certain image with a feature of the certain image to generate the relevant information; and memory that stores the generated relevant information.

9. The image processing device according to claim 8, wherein the processing circuitry is further configured to generate the relevant information for each image of the sequence of images.

10. The image processing device according to claim 8, wherein the memory stores a difference of the relevant information from a previous image.

11. The image processing device according to claim 1, wherein the processing circuitry is further configured to compare the first feature with the features of the immediately preceding image based on a histogram and a feature point of the image.

12. The image processing device according to claim 11, wherein the processing circuitry is further configured to compare the image with the immediately preceding image based on a recognition result of a character included in the image.

13. The image processing device according to claim 1, wherein the processing circuitry is further configured to set an entirety or a part of the image as a comparison target ramie, and a compare the first feature, which is in the comparison target range, with the immediately preceding image.

14. The image processing device according to claim 13, wherein the processing circuitry is further configured to set the comparison target range based on a layout of the image.

15. The image processing device according to claim 13, wherein the processing circuitry is further configured to set the comparison target range based on a learning result of an impartment position of write information.

16. The image processing de-ice according to claim 1, wherein the processing circuitry is further configured to:

analyze the image and extract the first feature of the image, compare the extracted first feature of the image with the features of the immediately preceding image, and search for the write information corresponding to the first feature of the image.

17. An image processing method, comprising:

displaying on a display, an image of a sequence of images, the image having a first feature;

comparing stored data of the first feature with features of an immediately preceding image in the sequence of images;

in response to determining that the first feature of the image does not match any of the features of the immediately preceding image, searching for first write information corresponding to the first feature, based on stored relevant information that associates write information with a corresponding feature; and displaying, on the display together with the image, the first write information corresponding to the first feature when the first write information is obtained from the search.

18. A non-transitory computer-readable medium storing a program that causes a computer to perform a method, comprising:

displaying, on a display, an image of a sequence of images, the image having a first feature;

comparing stored data of the first feature with features of an immediately preceding image in the sequence of images;

in response to determining that the first feature of the image does not match any of the features of the immediately preceding image, searching for first write information corresponding to the first feature, based on stored relevant information that associates write information with a corresponding feature; and displaying, on the display together with the image, the first write information corresponding to the first feature when the first write information is obtained from the search.

* * * * *